United States Patent
Nagarajan et al.

(10) Patent No.: US 12,483,878 B2
(45) Date of Patent: Nov. 25, 2025

(54) ON-DEVICE SHARED PROVISIONING SIM/ESIM CONTROLLER FOR A WIRELESS DEVICE

(71) Applicant: Apple Inc., Cupertino, CA (US)

(72) Inventors: Viswanath Nagarajan, San Jose, CA (US); Jean-Marc Padova, San Francisco, CA (US); Li Li, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 483 days.

(21) Appl. No.: 18/166,977

(22) Filed: Feb. 9, 2023

(65) Prior Publication Data

US 2024/0276203 A1  Aug. 15, 2024

(51) Int. Cl.
*H04W 8/20* (2009.01)
*H04W 48/16* (2009.01)
*H04W 60/00* (2009.01)
H04W 84/04 (2009.01)

(52) U.S. Cl.
CPC ............. *H04W 8/20* (2013.01); *H04W 48/16* (2013.01); *H04W 60/00* (2013.01); *H04W 84/042* (2013.01)

(58) Field of Classification Search
CPC ....... H04W 8/20; H04W 48/16; H04W 60/00; H04W 84/042
USPC ...................................................... 455/435.1
See application file for complete search history.

(56) References Cited

U.S. PATENT DOCUMENTS

| 9,439,062 B2 | 9/2016 | Li et al. |
| 11,523,269 B2 | 12/2022 | Bouskila et al. |
| 2016/0174069 A1* | 6/2016 | Bruner ................. H04L 63/065 455/411 |
| 2016/0246611 A1* | 8/2016 | Li ......................... H04W 8/183 |

OTHER PUBLICATIONS

PCT Patent Application No. PCT/US2023/084947—International Search Report and Written Opinion dated Apr. 29, 2024.

* cited by examiner

Primary Examiner — Chuck Huynh
(74) Attorney, Agent, or Firm — DICKINSON WRIGHT RLLP

(57) ABSTRACT

This application sets forth techniques for dynamically managing a shared provisioning electronic subscriber identity module (eSIM) for a wireless device. A shared (non-unique) provisioning eSIM is installed in the wireless device to provide limited functionality connectivity to services, such as for device activation and user eSIM provisioning. The shared provisioning eSIM includes records of IMSI values organized into groups of IMSI pools and priorities for selecting IMSI values for configuring the shared provisioning eSIM. An on-device shared provisioning SIM/eSIM controller resident on a cellular baseband processor of the wireless device selects and configures the shared provisioning eSIM with IMSI values based on the priorities and on results from scanning for available public land mobile networks (PLMNs). The shared provisioning eSIM can be re-configured with different IMSI values selected from different IMSI pools until successful registration using the configured provisioning eSIM occurs or a maximum number or retries occurs.

20 Claims, 19 Drawing Sheets

ELEMENTARY FILE (EF) INTERNATIONAL MOBILE SUBSCRIBER IDENTITY (IMSI)

| Identifier: '6F07' | Structure: transparent | Optional |
|---|---|---|
| SF1: '07' | | |
| File size: 9 bytes | | Update activity: low |

Access Conditions:
READ           PIN
UPDATE         ADM
DEACTIVATE     ADM
ACTIVATE       ADM

| Bytes | Description | M/O | Length |
|---|---|---|---|
| 1 | Length of IMSI | M | 1 byte |
| 2 to 9 | IMSI | M | 8 bytes |

This EF contains the IMSI and is at the USIM Application Data File (ADF) level

Length of IMSI: # of bytes required for IMSI value
IMSI: variable length

*FIG. 5*

EF – IMSIPool (1)

| Identifier: 'XXXX' | Structure: transparent | Optional |
|---|---|---|
| SFI: 'XX' | | |
| File size: 22n (n >= 1) bytes | | Update activity: low |

Access Conditions:
READ         PIN
UPDATE       ADM
DEACTIVATE   ADM
ACTIVATE     ADM

| Bytes | Description | M/O | Length |
|---|---|---|---|
| 1 to 2 | 1st IMSI pool – Group ID | M | 2 bytes |
| 3 | 1st IMSI pool – Priority | M | 1 byte |
| 4 | 1st IMSI pool – Length of IMSI and MNC length indicator | M | 1 byte |
| 5 to 12 | 1st IMSI pool – Start value of IMSI | M | 8 bytes |
| 13 to 20 | 1st IMSI pool – End value of IMSI | M | 8 bytes |
| 21 to 22 | 1st IMSI pool – Bit mask for IMSI digits incremented from Start to End values | M | 2 bytes |
| ... | | | |
| (22n-21) to (22n-20) | Nth IMSI pool – Group ID | M | 2 bytes |
| (22n-19) | Nth IMSI pool – Priority | M | 1 byte |
| (22n-18) | Nth IMSI pool – Length of IMSI and MNC length indicator | M | 1 byte |
| (22n-17) to (22n-10) | Nth IMSI pool – Start value of IMSI | M | 8 bytes |
| (22n-9) to (22n-2) | Nth IMSI pool – End value of IMSI | M | 8 bytes |
| (22n-1) to (22n) | Nth IMSI pool – Bit mask for IMSI digits incremented from Start to End values | M | 2 bytes |

1st IMSI Pool (20 bytes)

Last IMSI Pool (20 bytes)

This EF contains a prioritized list of IMSI pools from which a device may select an IMSI and use to activate a corresponding SIM profile
IMSI pool ranges shall be mutually disjoint (no overlap)

*FIG. 6A*

EF – IMSI Pool (II)

| Field | Contents | Coding |
|---|---|---|
| Group ID | ID for a group of IMSI pools that have identical content (i.e., belonging to the same carrier) in other elementary files, such as EF-IMSIPoolEHPLMN and EF-IMSIPoolOPLMNwACT | Any 2 byte value |
| Priority | Priority of the IMSI pool relative to other IMSI pools. Lower value indicates higher priority | 0 to 254<br>Priority 0 = highest, Priority 254 = lowest<br>Priority 255 = may be used to indicate IMSI pool has been decommissioned |
| Length of IMSI | Number of significant bytes, not including this length byte, required for the IMSI in this IMSI pool | Byte (22n-18): (n>=1)<br>(msb)b8 b7 b6 b5 b4 be b2 b1 (lsb)<br>b4 b3 b2 b1: Length of IMSI (per TS 131.102) |
| MNC Length Indicator | Indication of whether 2 or 3 digits are used for MNC portion of IMSI | b5: 0 = 2 digit MNC code in IMSI<br>1 = 3 digit MNC code in IMSI<br>b8 b7 b6 = unused (set to 0 value) |
| Start / End value of IMSI | First / Last value of IMSI in this IMSI pool | Start / End IMSI (per TS 131.102) |
| | Indicates which (consecutive) IMSI digits are to be incremented to generate a value IMSI range from a Start value to an End value in this IMSI pool | Byte (22n-1): (n>=1)<br>(msb) b8 b7 b6 b5 b4 b3 b2 b1 (lsb)<br>b1: indicates if IMSI BCD digit 1 changes in this IMSI pool<br>...<br>b8: indicates if IMSI BCD digit 8 changes in this IMSI pool<br>Byte (22n):<br>(msb) b8 b7 b6 b5 b4 b3 b2 b1 (lsb)<br>b1: indicates if IMSI BCD digit 9 changes in this IMSI pool<br>...<br>b7: indicates if IMSI BCD digit 15 changes in this IMSI pool<br>b8: unused (set to 0) |
| Bit mask for IMSI digits incremented from Start to End values | | |

*FIG. 6B*

EF – IMSIPoolEHPLMN (1)

| Identifier: 'XXXX' | | Structure: transparent | | Optional | |
|---|---|---|---|---|---|
| SFI: 'XX' | | | | | |
| File size: Variable number of bytes | | | | Update activity: low | |

Access Conditions:
READ         PIN
UPDATE       ADM
DEACTIVATE   ADM
ACTIVATE     ADM

| Bytes | Description | M/O | Length |
|---|---|---|---|
| 1 to 2 | 1st IMSI pool group – Group ID | M | 2 bytes |
| 3 | 1st IMSI pool group – Count of Equivalent Home PLMNs | M | 1 byte |
| 4 to 6 | 1st IMSI pool group – 1st EHPLMN (highest priority) | M | 3 bytes |
| 7 to 9 | 1st IMSI pool group – 2nd EHPLMN | O | 3 bytes |
| | ... | | |
| (3m+1) to (3m+3) | 1st IMSI pool group – Mth EHPLMN (lowest priority) | O | 3 bytes |
| Addressing as for 1st IMSI pool group's fields with starting offset one beyond ending offset of (N-1)th IMSI pool group's last EHPLMN | Nth IMSI pool group – Group ID | M | 2 bytes |
| | Nth IMSI pool group – Count of Equivalent Home PLMNs | M | 1 byte |
| | Nth IMSI pool group – 1st EHPLMN (highest priority) | M | 3 bytes |
| | Nth IMSI pool group – 2nd EHPLMN | O | 3 bytes |
| | ... | | |
| | Nth IMSI pool group – Mth EHPLMN (lowest priority) | O | 3 bytes |

Bytes 4 to (3m+3): 1st IMSI Pool Group's EHPLMNs

Last section: Last IMSI Pool Group's EHPLMNs

This EF contains a prioritized list of EHPLMNs for each IMSI pool configured in EF-IMSIPool IMSI pool groups without any EHLPLMNs are not referenced in this EF

*FIG. 7A*

EF – IMSI Pool|EHPLMN (II)

| Field | Contents | Coding |
|---|---|---|
| Group ID | ID for a group of IMSI pools that share an identical set of equivalent HPLMNs | Any 2 byte value used for representing an IMSI pool group in EF-IMSIPool |
| Count of equivalent HPLMNs | Total number of EHPLMNs configured for this IMSI pool group | 1 to 255<br>Do not configure an empty EHPLMN list for an IMSI pool group<br>Do not include an IMSI pool group in this EF to designate an empty EHPLMN list |
| EHPLMN | Mobile Country Code (MCC) followed by Mobile Network Code (MNC) | Per TS 131.102 EF-EHPLMN field 'EHPLMN'<br>Set unused entries to an uninitialized value (e.g., 'FF FF FF') |

EF – IMSIPoolOPLMNwACT (1)

| Identifier: 'XXXX' | Structure: transparent | Optional |
|---|---|---|
| SFI: 'XX' | | |
| File size: Variable number of bytes | | Update activity: low |

Access Conditions:
- READ           PIN
- UPDATE         ADM
- DEACTIVATE     ADM
- ACTIVATE       ADM

| Bytes | Description | M/O | Length |
|---|---|---|---|
| 1 to 2 | 1st IMSI pool group – Group ID | M | 2 bytes |
| 3 | 1st IMSI pool group – Count of Operator Preferred PLMNs and their ACTs | M | 1 byte |
| 4 to 6 | 1st IMSI pool group – 1st PLMN (highest priority) | M | 3 bytes |
| 7 to 8 | 1st IMSI pool group – 1st PLMN ACT identifier | M | 2 bytes |
| 9 to 11 | 1st IMSI pool group – 2nd PLMN | O | 3 bytes |
| 7 to 8 | 1st IMSI pool group – 2nd PLMN ACT identifier | O | 2 bytes |
| ... | | | |
| (5m-1) to (5m+1) | 1st IMSI pool group – Mth PLMN (lowest priority) | O | 3 bytes |
| (5m+2) to (5m+3) | 1st IMSI pool group – Mth PLMN ACT identifier | O | 2 bytes |
| Addressing as for 1st IMSI pool group's fields with starting offset one beyond ending offset of (N-1)th IMSI pool group's last field | Nth IMSI pool group – Group ID | M | 2 bytes |
| | Nth IMSI pool group – Count of Operator Preferred PLMNs and their ACTs | M | 1 byte |
| | Nth IMSI pool group – 1st PLMN (highest priority) | M | 3 bytes |
| | Nth IMSI pool group – 1st PLMN ACT identifier | M | 2 bytes |
| | Nth IMSI pool group – 2nd PLMN | O | 3 bytes |
| | Nth IMSI pool group – 2nd PLMN ACT identifier | O | 2 bytes |
| | ... | | |
| | Nth IMSI pool group – Mth PLMN (lowest priority) | O | 3 bytes |
| | Nth IMSI pool group – Mth PLMN ACT identifier | O | 2 bytes |

Rows 1st IMSI Pool Group's OPLMNwACT span the first group; rows Last IMSI Pool Group's OPLMNwACT span the last group.

This EF contains a prioritized list of Operator Preferred PLMNs (with each PLMN's access technologies) for each IMSI pool configured in EF-IMSIPool IMSI pool groups without any OPLMNs are not referenced in this EF

*FIG. 8A*

EF – IMSI PoolOPLMNwACT (II)

| Field | Contents | Coding |
|---|---|---|
| Group ID | ID for a group of IMSI pools that share an identical set of Operator Preferred PLMNs and their Access Technologies (ACTs) | Any 2 byte value used for representing an IMSI pool group in EF-IMSIPool |
| Count of Operator Preferred PLMNs With Their ACTs | Total number of OPLMNs with their ACTs configured for this IMSI pool group | 1 to 255<br>Do not configure an empty OPLMN list for an IMSI pool group<br>Do not include an IMSI pool group in this EF to designate an empty OPLMN list |
| PLMN | Mobile Country Code (MCC) followed by Mobile Network Code (MNC) | Per TS 131.102 EF-OPLMNwACT field 'PLMN' |
| PLMN ACT Identifier | PLMN's Access Technology Identifier | Per TS 131.102 EF-OPLMNwACT field 'PLMN' |

FIG. 8B

'SET IMSI' SIM COMMAND APDU

900

| Code | Value |
|---|---|
| CLA | Class per clause 10.1.1 of ETSI TS 102.221 |
| INS | Proprietary instruction code. (Any unused value of ETSI TS 102.221) |
| P1 | Parameter 1 coding indicated in table below |
| P2 | Parameter 2 = 00' |
| Lc | Coded per 'Length of IMSI' field of EF-IMSI per ETSI TS 31.102<br>Only used when setting a non-NULL IMSI value<br>Not included when clearing an IMSI value |
| Data | Coded per 'IMSI' field of EF-IMSI per ETSI TS 31.102<br>Only used when setting a non-NULL IMSI value<br>Not included when clearing an IMSI value |

'Set IMSI' SIM Command APDU Parameters

950

| b8 | b7 | b6 | b5 | b4 | b3 | b2 | b1 | Meaning |
|---|---|---|---|---|---|---|---|---|
| 0 | 0 | 0 | 0 | 0 | 0 | 0 | 0 | Clear IMSI value<br>Do not include Lc or Data fields |
| 0 | 0 | 0 | 0 | 0 | 0 | 0 | 1 | Set non-NULL IMSI value<br>Include Lc and Data fields |

'Set IMSI' SIM Command P1 Coding

FIG. 9

ON-DEVICE SHARED PROVISIONING SIM/ESIM CONTROLLER FOR A WIRELESS DEVICE

FIELD

The described embodiments set forth techniques for dynamically managing a provisioning subscriber identity module (SIM) or provisioning electronic SIM (eSIM) using an on-device shared provisioning SIM/eSIM controller in a wireless device. A shared (non-unique) provisioning SIM/eSIM is installed in the wireless device to provide a limited functionality connectivity option for essential services, such as device activation and user eSIM provisioning. The on-device shared provisioning SIM/eSIM controller on the wireless device manages configuration of the shared provisioning SIM/eSIM.

BACKGROUND

Many mobile wireless devices are configured to use removable Universal Integrated Circuit Cards (UICCs) that enable the mobile wireless devices to access services provided by Mobile Network Operators (MNOs), which may also be referred to as carriers. In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as subscriber identity module (SIM). Typically, a UICC takes the form of a small removable card, commonly referred to as a SIM card, which is inserted into a UICC-receiving bay of a mobile wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices.

A wireless device can include a provisioning SIM/eSIM, also referred to as a bootstrap SIM/eSIM, installed at a time of manufacture or dynamically thereafter to the wireless device. The provisioning SIM/eSIM provides a limited functionality connectivity option to allow the wireless device to connect to a cellular wireless network for essential services, such as for device activation, user eSIM installation, or the like. Presently, provisioning eSIMs can be uniquely generated and uniquely assigned to wireless devices individually; however, with alternative non-cellular wireless connectivity available in many cases, the uniquely assigned provisioning eSIMs included in many wireless devices are often unused. Dynamically assigning provisioning eSIMs to a wireless device with re-use of identity values in the provisioning eSIMs can result in multiple wireless devices attempting to use the same provisioning eSIM for network connectivity, which can be disallowed and interfere with access to cellular wireless networks for the wireless device. There exists a need for mechanisms to manage and dynamically configure a shared (non-unique) provisioning SIM/eSIM and detect and resolve attendant issues.

SUMMARY

This application sets forth techniques for dynamically managing a provisioning subscriber identity module (SIM) or provisioning electronic SIM (eSIM) using an on-device shared provisioning SIM/eSIM controller in a wireless device. A shared (non-unique) provisioning SIM/eSIM is installed in the wireless device to provide a limited functionality connectivity option for essential services, such as device activation and user eSIM provisioning. The on-device shared provisioning SIM/eSIM controller on the wireless device manages configuration of the shared provisioning SIM/eSIM. The provisioning SIM/eSIM is not unique to the wireless device, and identical provisioning SIMs/eSIMs can be installed in different wireless devices. Each provisioning SIM/eSIM is configurable after installation in the wireless device and can be adapted to work with various local cellular wireless networks managed by different mobile network operators (MNOs), also referred to herein as carriers.

A wireless device includes a shared provisioning SIM/eSIM, also referred to as a shared bootstrap SIM/eSIM, installed at a time of manufacture or provided dynamically to the wireless device thereafter. The shared provisioning SIM/eSIM is not uniquely assigned to the wireless device, as in past implementations, and can be configured to provide a limited functionality connectivity option to allow the wireless device to connect to a cellular wireless network for essential services, such as to connect to original equipment manufacturer (OEM) servers for device activation, to connect to mobile network operator (MNO) servers to provision, download and install a full functionality user eSIM, or the like. Instead of storing a set of statically assigned unique provisioning SIM/eSIM profiles, the wireless device is configured with the shared (non-unique) provisioning SIM/eSIM, which can be reconfigured one or more times to allow for connecting with different cellular wireless networks. The shared provisioning SIM/eSIM is initially configured with a null identifier, e.g., a particular international mobile subscriber identifier (IMSI) value that cannot be used for cellular network access. An on-device shared provisioning SIM/eSIM controller included in a cellular baseband processor of the wireless device selects an initial (non-null) IMSI value for the shared provisioning SIM/eSIM randomly based on one or more selection criteria. Exemplary selection criteria include a geographic location where the wireless device is operating, an MNO selection or preference indication from a user of the wireless device, an OEM contractual business arrangement with one or more MNOs for limited functionality cellular wireless network access for device configuration and/or eSIM provisioning, and/or information (e.g., hardware/software/firmware properties) specific to the wireless device. The initial IMSI value is selected by the on-device shared provisioning SIM/eSIM controller from a set of one or more IMSI pools included with the shared provisioning SIM/eSIM profile, where initial IMSI selection is prioritized based on the one or more selection criteria. Each IMSI pool includes a range of IMSI values between a start value and an end value covered by the specific IMSI pool. The on-device shared provisioning SIM/eSIM controller selects an IMSI pool based on selection criteria and then randomly selects an IMSI value from the selected IMSI pool. The on-device shared provisioning SIM/eSIM controller sends an application protocol data unit (APDU) command, e.g., a "Set IMSI" command, to a universal integrated circuit card (UICC) or embedded UICC (eUICC) on which the shared provisioning SIM/eSIM profile is stored, to configure the shared provisioning SIM/eSIM with the selected initial IMSI value. The initial IMSI value includes a mobile country code (MCC) value, a mobile network code (MNC) value, and a mobile subscription identification number (MSIN) value. Configuration of the shared provisioning SIM/eSIM with the initial IMSI value also includes selection of profile parameters for the shared provisioning SIM/eSIM in accordance with the selected initial IMSI value. Configuring the shared provisioning SIM/eSIM profile with additional parameters, after configuration with the initial IMSI value by the on-device shared provisioning SIM/eSIM controller, can be performed either automatically, by the shared SIM/eSIM provisioning profile on the eUICC in accordance with the selected initial IMSI value, or in some cases, one or more shared provisioning SIM/eSIM profile parameters can be configured by the on-device shared provisioning SIM/eSIM controller also. The cellular baseband processor then performs a network search and attempts to locate and register with a public land mobile network (PLMN) applicable to the configured shared provisioning SIM/eSIM. The cellular baseband processor can prioritize connecting to a home PLMN (HPLMN) or equivalent HPLMN (EHPLMN) and/or to an operator preferred PLMN (OPLMN). The on-device shared provisioning SIM/eSIM controller monitors registration attempts to PLMNs and determines whether one or more error conditions have occurred, e.g., indications of an IMSI collision between the IMSI value used by the wireless device and another wireless device or an invalid or expired cellular subscription. Responsive to one or more network attachment failures, the on-device shared provisioning SIM/eSIM controller switches to using a different IMSI value, which can be selected from an IMSI pool within a currently used IMSI pool group or from an IMSI pool in a different IMSI pool group. The on-device shared provisioning SIM/eSIM controller can account for a priority level of IMSI pools and other properties of IMSI pool groups, as well as PLMNs detected by the cellular baseband processor of the wireless device during a network scanning procedure, when selecting a new IMSI value, a new IMSI pool and/or a new IMSI pool group. The on-device shared provisioning SIM/eSIM controller reconfigures the shared provisioning SIM/eSIM with the newly selected IMSI value, which can also result in reconfiguration of additional profile parameters for the shared provisioning SIM/eSIM in accordance with the newly selected IMSI value, and the cellular baseband processor continues to search for PLMNs and attempt registration on applicable PLMNs based on profile parameters of the re-configured shared provisioning SIM/eSIM until successful attachment occurs or a maximum number of retries have been attempted. The cellular baseband processor can wait a configurable (fixed or variable) back-off delay time period before re-attempting attachment to one or more PLMNs.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIG. 5 illustrates a table for an exemplary elementary file (EF) storing an IMSI value, according to some embodiments.

FIGS. 6A and 6B illustrate tables for an exemplary EF storing IMSI pool values, according to some embodiments.

FIGS. 7A and 7B illustrate tables for an exemplary EF storing equivalent home PLMN (EHPLMN) values for IMSI pool groups, according to some embodiments.

FIGS. 8A and 8B illustrate tables for an exemplary EF storing operator preferred PLMN (OPLMN) values and access technology (ACT) identifier values for IMSI pool groups, according to some embodiments.

FIG. 9 illustrates tables for an exemplary application protocol data unit (APDU) command to set an IMSI value of a shared provisioning SIM/eSIM, according to some embodiments.

DETAILED DESCRIPTION

Figure 1:
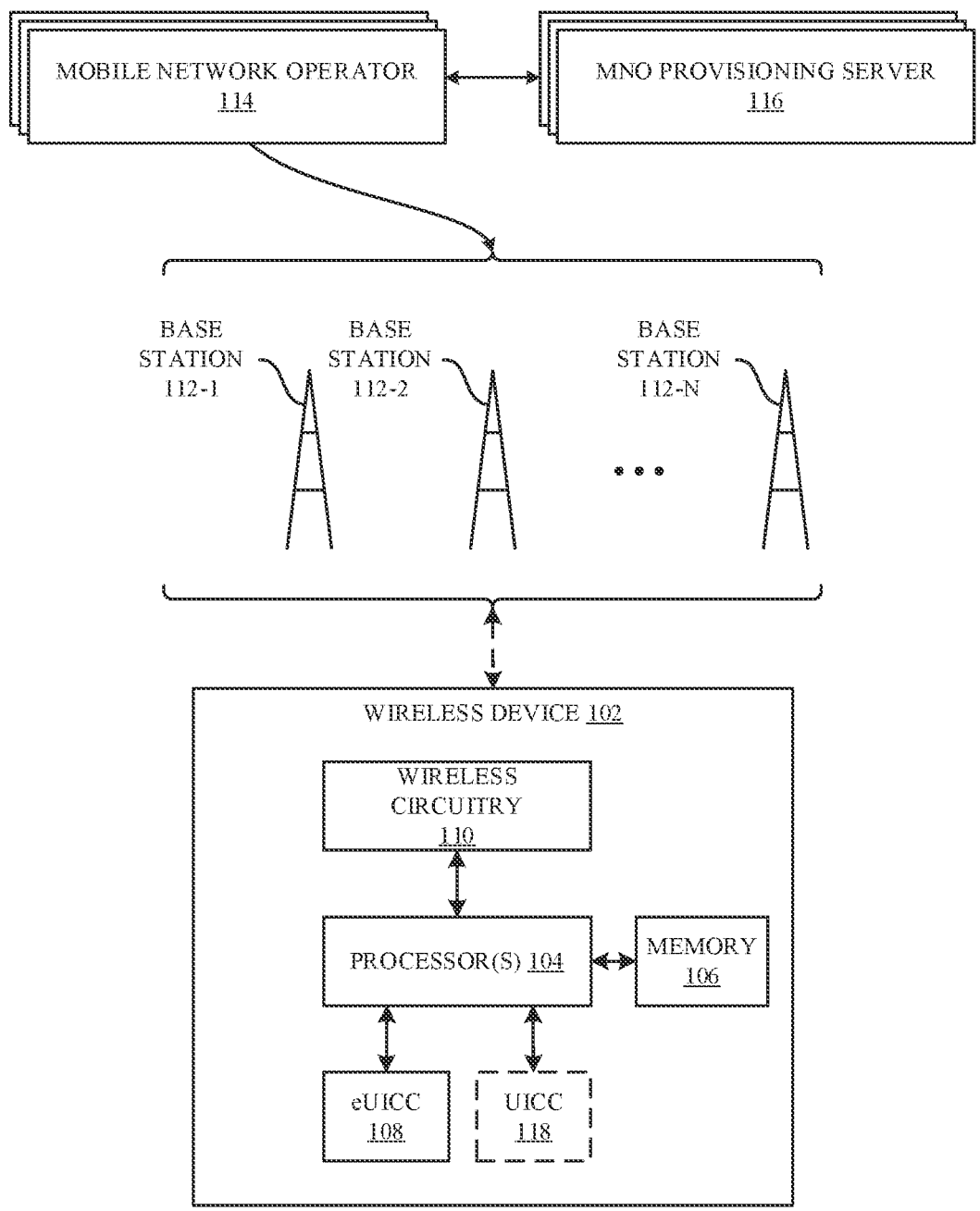
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

This application sets forth techniques for dynamically managing a provisioning subscriber identity module (SIM) or provisioning electronic SIM (eSIM) using an on-device shared provisioning SIM/eSIM controller in a wireless device. A shared (non-unique) provisioning SIM/eSIM is installed in the wireless device to provide a limited functionality connectivity option for essential services, such as device activation and user eSIM provisioning. The on-device shared provisioning SIM/eSIM controller on the wireless device manages dynamic configuration of the shared provisioning SIM/eSIM, rather than using a static provisioning SIM/eSIM uniquely assigned to the wireless device. The provisioning SIM/eSIM is not unique to the wireless device, and identical provisioning SIMs/eSIMs can be installed in different wireless devices. Each provisioning SIM/eSIM is configurable after installation in the wireless device and can be adapted to work with various local cellular wireless networks managed by different mobile network operators (MNOs), also referred to herein as carriers.

The wireless device includes a shared provisioning SIM/eSIM, also referred to as a shared bootstrap SIM/eSIM, installed at a time of manufacture or provided dynamically to the wireless device thereafter. The shared provisioning SIM/eSIM is not uniquely assigned to the wireless device, as in past implementations, and can be configured to provide a limited functionality connectivity option to allow the wireless device to connect to a cellular wireless network for essential services, such as to connect to original equipment manufacturer (OEM) servers for device activation, to connect to mobile network operator (MNO) servers to provision, download and install a full functionality user eSIM, or the like. Instead of storing a set of statically assigned unique provisioning SIM/eSIM profiles, the wireless device is configured with the shared (non-unique) provisioning SIM/eSIM, which can be reconfigured one or more times to allow for connecting with different cellular wireless networks. The shared provisioning SIM/eSIM is initially configured with a null valued identifier, e.g., a particular international mobile subscriber identifier (IMSI) value that cannot be used for cellular network access. An on-device shared provisioning SIM/eSIM controller included in a cellular baseband processor of the wireless device selects an initial (non-null) IMSI value for the shared provisioning SIM/eSIM randomly from an IMSI pool of IMSI values, where the IMSI pool is chosen by the on-device shared provisioning SIM/eSIM controller based on one or more selection criteria. Exemplary selection criteria for the initial IMSI pool from which to select an IMSI value include a geographic location of the wireless device where the wireless device is operating, which can be based on scanning for cellular wireless network broadcast signals from which geographic location information can be determined, an indication of a mobile network operator (MNO) selection or preference by a user of the wireless device, an OEM contractual business arrangement with one or more MNOs for limited functionality cellular wireless network access, and/or information (e.g., hardware/software/firmware properties) specific to the wireless device. Exemplary properties of the wireless device useful for initial IMSI selection can include a hardware identifier of the wireless device, e.g., a model number or a product stock keeping unit (SKU) value, or a geographic region code assigned to the wireless device. The initial IMSI value is selected from a set of one or more IMSI pools included with the shared provisioning SIM/eSIM with selection prioritized based on the one or more selection criteria. Each IMSI pool includes a range of IMSI values between a start value and an end value covered by the specific IMSI pool.

The on-device shared provisioning SIM/eSIM controller sends an application protocol data unit (APDU) command, e.g., a "Set IMSI" command, to a universal integrated circuit card (UICC) or embedded UICC (eUICC) on which the shared provisioning SIM/eSIM is stored, to configure the shared provisioning SIM/eSIM with the selected initial IMSI value. The initial IMSI value includes a mobile country code (MCC) value, a mobile network code (MNC) value, and a mobile subscription identification number (MSIN) value. Configuration of the shared provisioning SIM/eSIM with the initial IMSI value also includes selection of profile parameters for the shared provisioning SIM/eSIM in accordance with the selected initial IMSI value. Configuring the shared provisioning SIM/eSIM profile with additional profile parameters, after configuration with the initial IMSI value by the on-device shared provisioning SIM/eSIM controller, can be performed either automatically, by the shared SIM/eSIM provisioning profile on the eUICC in accordance with the selected initial IMSI value, or in some cases, one or more shared provisioning SIM/eSIM profile parameters can be configured by the on-device shared provisioning SIM/eSIM controller also. The cellular baseband processor then performs a search for cellular wireless networks and attempts to locate and register with a public land mobile network (PLMN) applicable to the configured shared provisioning SIM/eSIM. The shared provisioning SIM/eSIM controller of the cellular baseband processor can prioritize connecting to a home PLMN (HPLMN) or to an equivalent HPLMN (EHPLMN) and/or to an operator preferred PLMN (OPLMN) over other PLMNs. Each selectable IMSI value can be included in an IMSI pool of IMSI values, where the IMSI pool is associated with an IMSI pool group identifier (ID) value. Multiple IMSI pools can shared the same IMSI pool group ID and form an IMSI pool group. Each IMSI pool group can be associated with a prioritized list of EHPLMNs and a prioritized list of OPLMNs, which can also include associated radio access technologies (RATs) used by the OPLMNs. Selection of an IMSI value in an IMSI pool group can determine associated EHPLMN and OPLMN lists, where connection to an EHPLMN or OPLMN can be preferred. Selection of an IMSI pool group and/or IMSI value can also depend on cellular wireless networks previously located based on network scanning by the cellular baseband processor of the wireless device.

The on-device shared provisioning SIM/eSIM controller monitors registration attempts to PLMNs and determines whether one or more error conditions have occurred, e.g., an IMSI collision indicating the IMSI value with which the shared provisioning SIM/eSIM is configured may be in use by another wireless device, or indications of an invalid or expired cellular subscription. Responsive to one or more network attachment failures, the on-device shared provisioning SIM/eSIM controller switches to another IMSI value. The new IMSI value can be selected from an IMSI pool group from which the currently used IMSI value was previously selected or from a different IMSI pool group. The on-device shared provisioning SIM/eSIM controller accounts for a priority level and other properties of IMSI pool groups, as well as PLMNs detected by the cellular baseband processor of the wireless device when selecting a new IMSI value from a current IMSI pool group or when switching IMSI pool groups before selecting a new IMSI value. The on-device shared provisioning SIM/eSIM controller reconfigures the shared provisioning SIM/eSIM with the newly selected IMSI value, which can result in re-configuration of profile parameters for the shared provisioning SIM/eSIM in accordance with the new IMSI value, and the cellular baseband processor continues to search for PLMNs and attempt registration on applicable PLMNs based on profile parameters of the re-configured shared provisioning SIM/eSIM until successful attachment occurs or a maximum number of retries have been attempted. The cellular baseband processor can wait a configurable (fixed or variable) back-off delay time period before re-attempting attachment to one or more PLMNs.

The shared provisioning SIM/eSIM includes a record of IMSI pool groups associated with same or different MNOs, where each IMSI pool group is assigned a priority level and an IMSI pool group identifier (ID) value and includes one or more IMSI pools of IMSI values. Each IMSI pool group ID value corresponds to a prioritized list of EHPLMNs and a prioritize list of OPLMNs with associated radio access technologies (RATs), also referred to as access technologies (ACTs) here. Each list of EHPLMNs or OPLMNs with ACTs is arranged in a prioritized order, e.g., from a highest priority to a lowest priority. The on-device shared provisioning SIM/eSIM controller can use the priority levels for the PLMNs and priority levels for the IMSI pools to determine an IMSI pool group from which to select IMSI values and how to select IMSI values from an IMSI pool group. An MNO can be associated with multiple IMSI pools belonging to the same IMSI pool group, i.e., having the same IMSI pool group ID value. Each IMSI pool in the same IMSI pool group is therefore associated with a common prioritized list of EHPLMNs and a separate common prioritized list of OPLMNs. An MNO can also be associated with IMSI pools that belong to different IMSI pool groups, where each IMSI pool group is associated with a distinct prioritized list of EHPLMNs and a separate prioritized list of OPLMNs.

These and other embodiments are discussed below with reference to FIGS. 1 through 13; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a wireless device 102, which can also be referred to as a mobile device, a cellular device, a user equipment (UE) and the like, a group of base stations 112-1 to 112-N that are managed by different Mobile Network Operators (MNOs) 114, and a set of provisioning servers 116 that are in communication with the MNOs 114. Additional MNO infrastructure servers, such as used for account management and billing are not shown. The wireless device 102 can represent a mobile computing device (e.g., an iPhone® or an iPad® by Apple®), the base stations 112-1 to 112-n can represent cellular wireless network entities including evolved NodeBs (eNodeBs or eNBs), for fourth generation (4G) long term evolution (LTE) cellular wireless networks, and/or next generation NodeBs (gNodeBs or gNB), for fifth generation (5G) new radio (NR) cellular wireless networks, where the cellular wireless base stations 112-1 to 112-n are configured to communicate with the wireless device 102, and the MNOs 114 can represent different wireless service providers that provide specific cellular wireless services (e.g., voice and data) to which the wireless device 102 can subscribe, such as via a subscription account for a user of the wireless device 102.

As shown in FIG. 1, the wireless device 102 can include processing circuitry, which can include one or more processor(s) 104 and a memory 106, an embedded Universal Integrated Circuit Card (eUICC) 108, and wireless circuitry 110 used for transmission and reception of cellular wireless radio frequency signals. The wireless circuitry 110 can include analog hardware components, such as antennas and amplifiers, as well as digital processing components, such as signal processors (and/or general/limited purpose processors) and associated memory. In some embodiments, the wireless device 102 includes one or more physical UICCs 118, also referred to as Subscriber Identity Module (SIM) cards, in addition to or substituting for the eUICC 108. The components of the wireless device 102 work together to enable the wireless device 102 to provide useful features to a user of the wireless device 102, such as cellular wireless network access, non-cellular wireless network access, localized computing, location-based services, and Internet connectivity. The eUICC 108 can be configured to store multiple electronic SIMs (eSIMs) for accessing cellular wireless services provided by different MNOs 114 by connecting to their respective cellular wireless networks through base stations 112-1 to 112-N. For example, the eUICC 108 can be configured to store and manage one or more eSIMs for one or more MNOs 114 for different subscriptions to which the wireless device 102 is associated. To be able to access services provided by an MNO, an eSIM can be reserved for download and installation to the eUICC 108. In some embodiments, the eUICC 108 obtains one or more eSIMs from one or more associated provisioning servers 116 as part of a device initialization of the wireless device 102, such as when purchasing a new wireless device 102. The provisioning servers 116 can be maintained by a manufacturer of the wireless device 102, the MNOs 114, third party entities, and the like. Communication of eSIM data between an MNO provisioning server 116 and the eUICC 108 (or between the MNO provisioning server 116 and processing circuitry of the wireless device 102 external to the eUICC 108, e.g., the processor 104) can use a secure communication channel.

The wireless device 102, upon initial acquisition by a user, can lack an activated fully functional cellular wireless eSIM on the eUICC 108 and in some cases may also not include a UICC 118 with an activated physical SIM (pSIM) installed in the wireless device 102. The user of the wireless device 102 can be required to download a fully functional eSIM from an MNO provisioning server 116 to access cellular wireless services of a particular MNO with which the user establishes a cellular wireless subscription. After a power-up procedure, the wireless device 102 can enable a limited functionality shared provisioning SIM (on a UICC 118) or a shared provisioning eSIM (on the eUICC 108) and configure the shared provisioning SIM/eSIM to allow the wireless device 102 to connect to a cellular wireless network to perform a limited set of functions, e.g., to initialize and configure the wireless device 102 for a user using an original equipment manufacturer (OEM) procedure and/or to communicate with one or more MNO provisioning servers 116 to obtain fully functional eSIMs with which to access cellular wireless services provided by associated MNOs 114.

Figure 2:
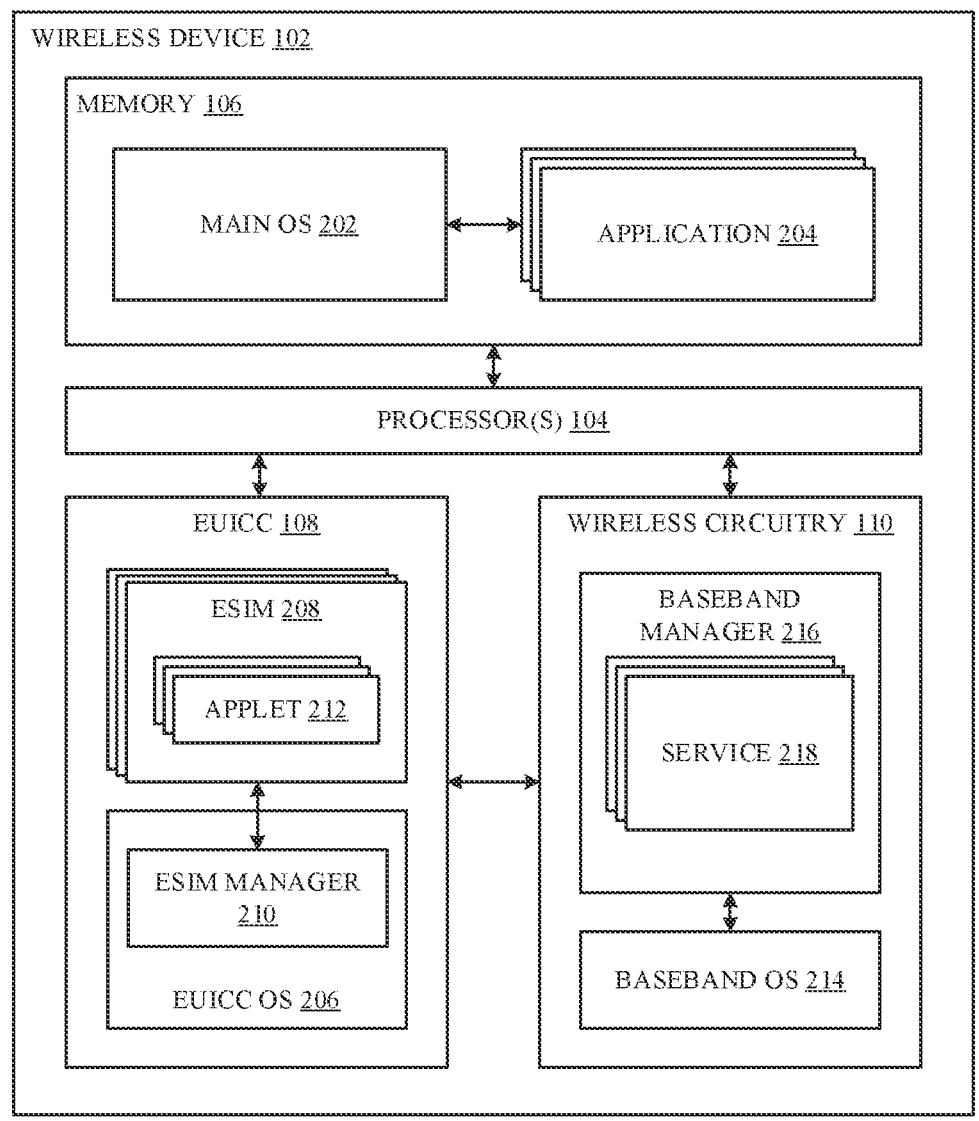
FIG. 2 illustrates a block diagram of a more detailed view of exemplary components of the system of FIG. 1, according to some embodiments.

FIG. 2 illustrates a block diagram of a more detailed view 200 of particular components of the wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC 108, e.g., by downloading, installing, deleting, enabling, disabling, modifying, or otherwise performing management of the eSIMs 208 within the eUICC 108 and providing baseband wireless circuitry 110 with access to the eSIMs 208 to provide access to wireless services for the wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with wireless circuitry 110 and the eUICC 108, can be configured to enable the wireless device 102 to communicate with an MNO 114 and provide useful features (e.g., phone calls and internet access) to a user of the wireless device 102.

As also shown in FIG. 2, the wireless circuitry 110 of the wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtaining information (such as eSIM data) from the MNO provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the wireless device 102 and MNOs 114 according to the different eSIMs 208 that are enabled within the eUICC 108. For a shared provisioning eSIM 208 that provides limited functionality restricted to certain data connections, when a cellular wireless connections via a fully functional user eSIM 208 or a non-cellular wireless connection is unavailable, the wireless device 102 can configure the shared provisioning eSIM 208, attempt to connect with a cellular wireless network using profile parameters of the shared provisioning eSIM 208, and re-configure the shared provisioning eSIM 208 one or more times if required to re-attempt connecting with one or more cellular wireless networks.

Figure 3:
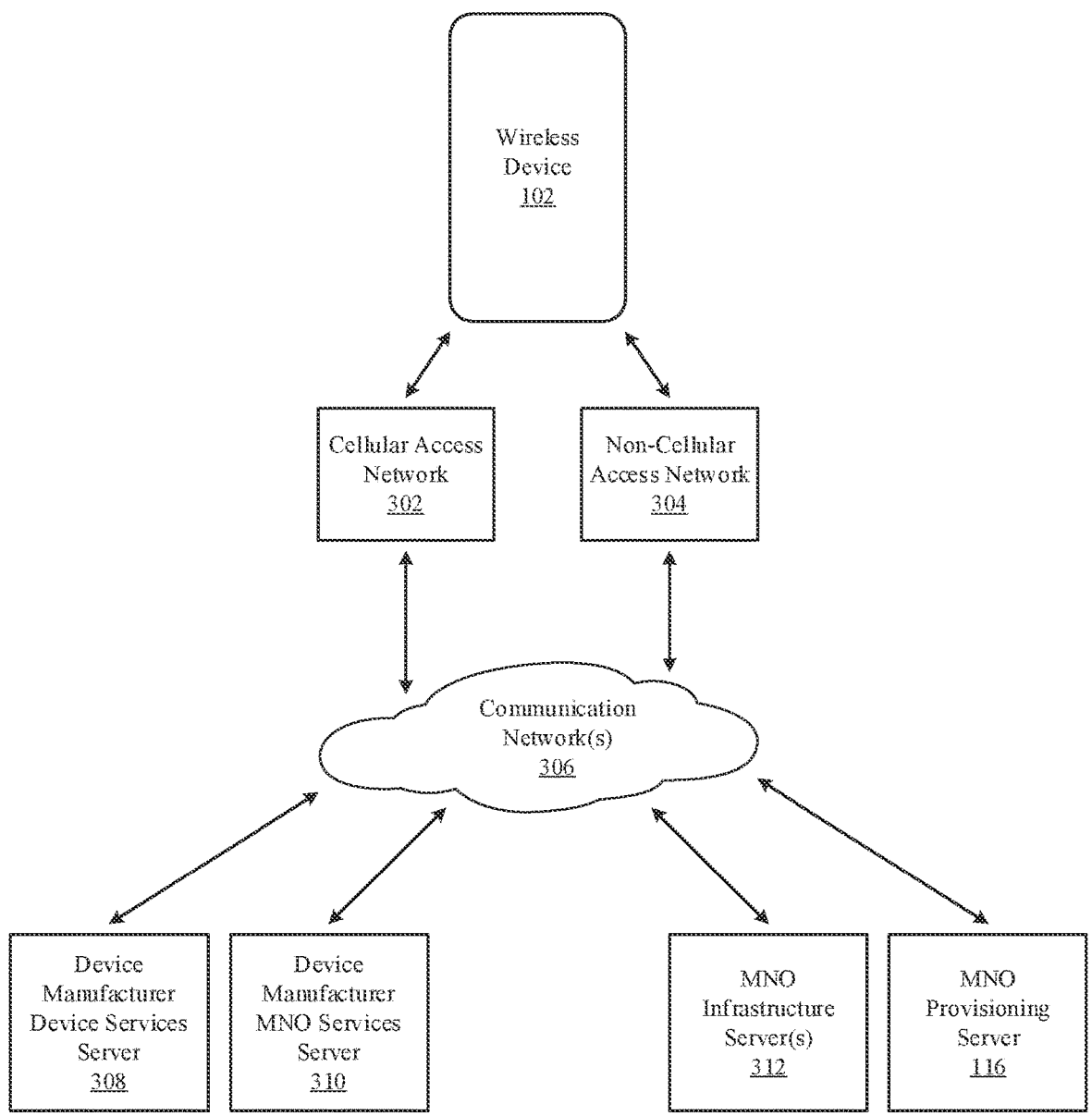
FIG. 3 illustrates an exemplary device activation and provisioning network for a mobile wireless device, according to some embodiments.

FIG. 3 illustrates a diagram 300 of elements of communication network involved in device activation and SIM provisioning, installation, and activation for a wireless device 102. Data connectivity for the wireless device 102 can be required for device activation and SIM provisioning. In some scenarios, a non-cellular access network 304 can be available for the wireless device 102 to connect to various device manufacturer managed and/or MNO 114 managed servers via intervening communication networks 306. In some scenarios, a non-cellular access network 304 may be not available, and the wireless device 102 may rely on access to a cellular access network 302 for activation of the wireless device 102 and for SIM provisioning, e.g., downloading and installation of a fully functional user eSIM 208 to the wireless device 102. In some embodiments, the wireless device 102 includes a limited functionality shared (configurable) provisioning SIM/eSIM profile that can be used to obtain limited access to a cellular access network 302 for provisioning a fully functional user eSIM 208, e.g., when access to a non-cellular access network 304 that can interconnect to the required servers is not available. An original equipment manufacturer (OEM) of the wireless device 102 can maintain multiple network-based servers to assist with management of the wireless device 102, e.g., a device manufacturer managed device services server 308, which can provide management for device manufacturer supplied services to the wireless device 102, and a device manufacturer managed MNO services server 310, which can provide a device manufacturer anchor for management of MNO supplied services to the wireless device 102. An MNO 114 can also provide their own set of servers, including various MNO infrastructure servers 312 for managing cellular access, authentication, authorization, subscription, billing, and other associated management functions for cellular wireless services for the wireless device 102, and MNO provisioning servers 116 from which SIM firmware, e.g., eSIMs 208, OTA updates for eSIMs 208 etc., can be accessed, with appropriate authentication, by the wireless device 102.

Figure 4:
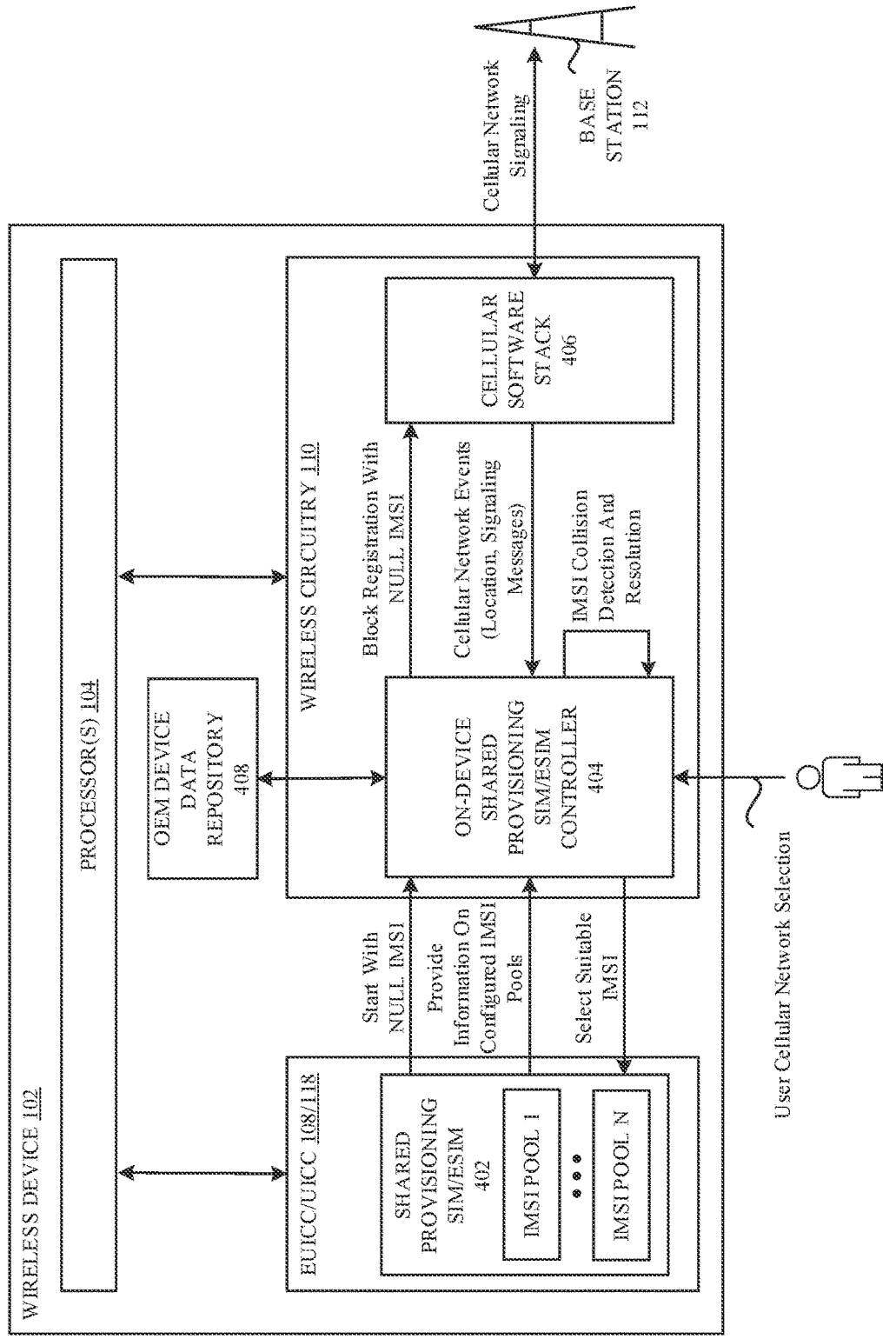
FIG. 4 illustrates a block diagram of exemplary shared provisioning SIM/eSIM, IMSI selection system, according to some embodiments.

FIG. 4 illustrates a diagram 400 of an exemplary system for selecting an international mobile subscriber identity (IMSI) value for a shared provisioning SIM/eSIM 402. The shared provisioning SIM/eSIM 402, previously installed in a UICC 118 (for a SIM) or on an eUICC 108 (for an eSIM 208), includes a record of IMSI values organized into IMSI pools and aggregated into IMSI pool groups, from which an on-device shared provisioning SIM/eSIM controller 404 of the wireless circuitry 110 of the wireless device 102 can select an IMSI value for configuring the shared provisioning SIM/eSIM 402. The selected IMSI value can be associated with a set of profile parameters with which to also configure the shared provisioning SIM/eSIM when configured with the selected IMSI value. A configurable shared provisioning SIM/eSIM 402 advantageously can be reconfigured multiple times with different IMSI values if required in order to locate and connect to a cellular wireless network to gain limited access for use by the wireless device 102, e.g., to communicate with OEM configuration servers and/or to download and install a fully functional user eSIM 208 from an MNO provisioning server 116. The IMSI value with which the shared provisioning SIM/eSIM is configured may not be unique to the wireless device 102, and therefore an IMSI collision between two different wireless devices 102 using the same IMSI value may occur. The wireless device 102 may detect indications of such an IMSI collision and select a different IMSI value with which to reconfigure the shared provisioning SIM/eSIM 402 in order to continue with an initialization, configuration, or provisioning procedure for the wireless device 102.

After a power-up procedure, the shared provisioning SIM/eSIM 402 can be configured to use a null IMSI value, e.g., a particular designated IMSI value that cannot be used for access to cellular wireless networks. The on-device shared provisioning SIM/eSIM controller 404, which can be resident on a cellular baseband processor of wireless circuitry 110 of the wireless device 102, can obtain an indication from the eUICC/UICC 108/118 that the shared provisioning SIM/eSIM 402 is configured with the null value IMSI and can block a cellular software stack 406 of the cellular baseband processor from attempting registration with cellular wireless networks using the null value IMSI. The cellular software stack 406 of the baseband processor can scan for cellular network signals to determine PLMNs available in the vicinity of the wireless device 102. The on-device shared provisioning SIM/eSIM controller 404 obtains from the shared provisioning SIM/eSIM 402 information on configured IMSI pools/pool groups available to use for configuring the shared provisioning SIM/eSIM 402. The on-device shared provisioning SIM/eSIM controller 404 can select an initial IMSI value based on the IMSI pool/pool group information. In some embodiments, the on-device shared provisioning SIM/eSIM controller 404 can select the initial IMSI value also based on additional information that is not directly available to the shared provisioning SIM/eSIM 402 or the eUICC/UICC 108/118. Exemplary additional information can include a geographic location (e.g., country or region) in which the wireless device 102 is operating, which can be determined by the on-device shared provisioning SIM/eSIM controller 404 based on information provided from the cellular software stack 406 from scanning for cellular wireless network broadcast signals. The on-device shared provisioning SIM/eSIM controller 404 can prioritize selecting of an IMSI value from an IMSI pool/pool group based on the determined location of the wireless device 102. The exemplary additional information can also include device specific information, such as a hardware model number of the wireless device 102, a stock keeping unit (SKU) value for the wireless device 102, or a region code assigned to the wireless device 102. The device specific information can be obtained from an OEM device data repository 408 stored locally in the wireless device 102. In some cases, the wireless device 102 obtains an indication of user selection or preference for an MNO 114 with which a cellular wireless service subscription is to be used for the wireless device 102, and the on-device shared provisioning SIM/eSIM controller 404 accounts for the user selected (or preferred) MNO 114 when determining an IMSI pool/pool group from which to select an initial IMSI value for configuring the shared provisioning SIM/eSIM 402. For example, certain IMSI pools/pool groups can be associated with certain MNOs 114. The on-device shared provisioning SIM/eSIM controller 404 can also determine an IMSI pool/pool group to use for selection of an initial IMSI value based on partnership agreements between the OEM of the wireless device 102 and one or more MNOs 114 that may be preferred to use for obtaining cellular wireless network access for configuring the wireless device 102. In some cases, the OEM of the wireless device 102 can have agreements with multiple MNOs 114 and can seek to distribute selection of IMSI values for shared provisioning SIM/eSIMs 402 among multiple IMSI pools/pool groups associated with the different MNOs 114. The on-device shared provisioning SIM/eSIM controller 404 can prioritize use of certain IMSI pools/pool groups (e.g., those associated with a first set of one or more MNOs 114) over other IMSI pools/pool groups (e.g., those associated with a second set of one or more MNOs 114) based on various selection criteria when determining initial IMSI values for configuring the shared provisioning SIM/eSIM 402 and also when selecting subsequent IMSI values for re-configuring the shared provisioning SIM/eSIM 402. Each IMSI value includes a mobile country code (MCC) value, a mobile network code (MNC) value, and a mobile subscription identification number (MSIN) value.

The on-device shared provisioning SIM/eSIM controller 404 can select a suitable IMSI value for the shared provisioning SIM/eSIM 402 and send an application protocol data unit (APDU) command to the eUICC/UICC 108/118 to configure the shared provisioning SIM/eSIM 402 to use the selected IMSI value. Configuration of the shared provisioning SIM/eSIM with the selected IMSI value also includes selection of profile parameters for the shared provisioning SIM/eSIM in accordance with the selected initial IMSI value. Configuring the shared provisioning SIM/eSIM profile with additional profile parameters, after configuration with the initial IMSI value by the on-device shared provisioning SIM/eSIM controller, can be performed either automatically, by the shared SIM/eSIM provisioning profile on the eUICC in accordance with the selected initial IMSI value, or in some cases, one or more shared provisioning SIM/eSIM profile parameters can be configured by the on-device shared provisioning SIM/eSIM controller also. The cellular software stack 406 of the wireless circuitry 110 can attempt to connect to a cellular wireless network using profile parameters of the shared provisioning SIM/eSIM 402 configured with the selected IMSI value. The on-device shared provisioning SIM/eSIM controller 404 can monitor information from the cellular software stack 406, e.g., network signaling messages, to determine whether an IMSI collision has occurred, e.g., where two different wireless devices 102 attempt to establish or maintain connections using an identical IMSI value, which can be disallowed by cellular wireless networks. Different cellular wireless networks can react differently to an IMSI collision, and not all network signaling message information is available to the shared provisioning SIM/eSIM 402 or the eUICC/UICC 108/118, and therefore detection and resolution of IMSI collision is advantageously performed by the on-device shared provisioning SIM/eSIM controller 404 on the wireless circuitry 110 of the wireless device 102 external to the eUICC/UICC 108/118. The on-device shared provisioning SIM/eSIM controller 404 can opt to select another IMSI value from a set of IMSI pools/pool groups, send another APDU command to the eUICC/UICC 108/118 to re-configure the shared provisioning SIM/eSIM 402 with the newly selected IMSI value, and re-attempt to connect to a cellular wireless network using profile parameters of the re-configured shared provisioning SIM/eSIM 402. As discussed further herein, the on-device shared provisioning SIM/eSIM controller 404 can prioritize selection of IMSI values from different IMSI pools and different IMSI pool groups based on various criteria. The IMSI values stored in the shared provisioning SIM/eSIM 402 can be organized into IMSI pools of multiple IMSI values and aggregated into IMSI pool groups associated with group identifier (ID) values. An IMSI pool group can also be associated with a prioritized list of equivalent home PLMNs (EHPLMNs) and a prioritized list of operator preferred PLMNs (OPLMNs), and the on-device shared provisioning SIM/eSIM controller 404 can use information about PLMNs detected by the cellular software stack 406 during a network scanning procedure to inform decisions on which IMSI pool/pool group to use for selection of IMSI values for configuring the shared provisioning SIM/eSIM 402.

FIG. 5 illustrates a table 500 of a standardized structure for an elementary file (EF) for storing an IMSI value in a SIM/eSIM. The IMSI EF contains the IMSI value along with an indication of a length of the IMSI value, as the number of bytes for an IMSI value can vary based on different geographic regions and/or MNOs 114. The IMSI EF is stored in the SIM/eSIM at the universal SIM (USIM) application data file (ADF) level.

FIG. 6A illustrates a table 600 of an exemplary structure for an EF for storing one or more IMSI pools of IMSI values. Each IMSI pool is associated with a group identifier (ID) value, a priority level, a length of IMSI and mobile network code (MNC) length indicator value, an initial (start) IMSI value, a final (end) IMSI value, and a bit mask to indicate IMSI digits that are incremented between the initial (start) IMSI value and the final (end) IMSI value. The IMSI pool EF defines a set of prioritized IMSI pools from which the on-device shared provisioning SIM/eSIM controller 404 can select an IMSI value and use to configure the shared provisioning SIM/eSIM 402 to use for accessing a cellular wireless network. The IMSI values in each IMSI pool are mutually disjoint, i.e., there is no overlap in IMSI values between different IMSI pools.

FIG. 6B illustrates a table 650 providing additional information regarding the individual fields of the IMSI pool elementary file (EF) of FIG. 6A. Each IMSI pool can be assigned a group ID value that indicates an IMSI pool group (i.e., a group of IMSI pools) to which the IMSI pool belongs, where all IMSI pools in the IMSI pool group share an identical group ID value and also have identical MNO content for additional elementary files, e.g., an elementary file for EHPLMNs associated with the IMSI pool group (and therefore with the IMSI pools of the IMSI pool group) and an elementary file for OPLMNs associated with the IMSI pool group (and therefore with the IMSI pools of the IMSI pool group). Each IMSI pool is also assigned a priority level relative to other IMSI pools, e.g., where lower values are associated with a higher priority level and higher values are associated with a lower priority level. In some embodiments, the priority value varies from 0 (highest priority) to 254 (lowest priority), where a priority value of 255 can be used to indicate an IMSI pool that is no longer used, e.g., decommissioned. The length of the IMSI value indicates a number of bytes for an IMSI value in the IMSI pool, and the MNC length indicator value indicates whether the MNC portion of the IMSI value uses two digits or three digits (which can be region dependent). Starting and ending values for IMSIs of an IMSI pool can be configured according to 3GPP standards, e.g., per Technical Specification (TS) 131.102. The bit mask indicates which consecutive IMSI digits are to be incremented to generate a valid IMSI value within a range of IMSI values from the starting IMSI value to the ending IMSI value of the IMSI pool.

FIG. 7A illustrates a table 700 of an exemplary structure for an EF for storing equivalent home PLMNs (EHPLMNs) for IMSI pools organized into IMSI pool groups as specified in the IMSI pool EF. Each IMSI pool group that has associated EHPLMNs is assigned an IMSI pool group ID value and an indication of the number (count) of EHPLMNs associated with the IMSI pool group. The EHPLMNs are listed in a prioritized order for each IMSI pool group. An IMSI pool group that does not have any associated EHPLMNs may be not referenced in the IMSI pool EHPLMN EF.

FIG. 7B illustrates a table 750 providing additional information regarding the individual fields of the IMSI pool EHPLMN EF of FIG. 7A. IMSI pool groups are assigned an IMSI pool group ID value, and all IMSI pools in a particular IMSI pool group share the same group ID value and also share an identical set of EHPLMNs (so the list of prioritized EHPLMNs for the individual IMSI pools of an IMSI pool group is the same). The total number of EHPLMNs configured for the IMSI pool group is specified by the count of EHPLMNs and can range from 1 to 255. An IMSI pool group that has no associated EHPLMNs should not be referenced in the IMSI pool EHPLMN EF. Each EHPLMN included in the list of EHPLMNs can be designated by a mobile country code (MCC) value and a mobile network code (MNC) value per the 3GPP standard TS 131.102.

FIG. 8A illustrates a table 800 of an exemplary structure for an EF for storing operator preferred PLMNs (OPLMNs) with identifiers of associated access technologies (ACTs), which can also be referred to as radio access technologies (RATs) such as 4G LTE or 5G NR, for the OPLMNs for IMSI pool groups specified in the IMSI pool EF. Each IMSI pool group that has associated OPLMNs is assigned a group ID value and an indication of the number OPLMNs with their ACTs configured for the IMSI pool group, where each OPLMN identifier is accompanied by an associated ACT identifier value. The OPLMNs are listed in prioritized order for each IMSI pool group. An IMSI pool group that does not have any associated OPLMNs may be not referenced in the IMSI pool OPLMNwACT EF.

FIG. 8B illustrates a table 850 providing additional information regarding the individual fields of the IMSI pool OPLMNwACT EF of FIG. 8A. IMSI pool groups are assigned an IMSI pool group ID value, and all IMSI pools in a particular IMSI pool group share the same group ID value and also share an identical set of OPLMNs (so the list of prioritized OPLMNs for the individual IMSI pools of an IMSI pool group is the same). The total number of OPLMNs configured for the IMSI pool group is specified by the count of OPLMNs and can range from 1 to 255. An IMSI pool group that has no associated OPLMNs should not be referenced in the IMSI pool OPLMNwACT EF. Each OPLMN included in the list of OPLMNs can be designated by a mobile country code (MCC) value and a mobile network code (MNC) value per the 3GPP standard TS 131.102. Each OPLMN access technology is indicated by an ACT identifier value, which can be coded per TS 131.102.

FIG. 9 illustrates tables 900, 950 that specify a 'Set IMSI' APDU command for configuring an IMSI value of the shared provisioning SIM/eSIM 402 of the UICC/eUICC 118/108 of the wireless device 102. The class code of the 'Set IMSI' APDU command can be configured according to TS 102.221, and a proprietary instruction code for the 'Set IMSI' APDU command can an unused (or appropriately designated) APDU instruction code value per TS 102.221. The 'Set IMSI' APDU command further includes a first parameter field (P1) with values specified in table 950, where a first P1 value, e.g., '00000000' indicates that the IMSI value of the shared provisioning SIM/eSIM 402 should be cleared of any previous stored value, and a second P1 value, e.g., '00000001' indicates that a non-null IMSI value coded per the 'Lc' and 'Data' fields should be configured in the shared provisioning SIM/eSIM 402. The on-device shared provisioning SIM/eSIM controller 404 selects an IMSI value from an IMSI pool that is specified by the IMSI pool EF included in the shared provisioning SIM/eSIM 402 and sends to the UICC/eUICC 118/108 the 'Set IMSI' command with the selected IMSI value to configure the shared provisioning SIM/eSIM 402. A universal SIM (USIM) application for the shared provisioning SIM/eSIM 402 can be selected by the on-device shared provisioning SIM/eSIM controller 404 before issuing the 'Set IMSI' APDU command. A refresh mechanism can be used to synchronize contents for the shared provisioning SIM/eSIM 402 maintained by the on-device shared provisioning SIM/eSIM controller 404 with the actual contents of the shared provisioning SIM/eSIM 402 after the 'Set IMSI' command has been sent. In some cases, an IMSI refresh command is provided by the shared provisioning SIM/eSIM 402 to the one-device shared provisioning SIM/eSIM controller 404 responsive to a status command indicating "USIM application is initialized in the terminal" sent from the on-device shared provisioning SIM/eSIM controller 404 to the shared provisioning SIM/eSIM 402. When an invalid non-null IMSI value is provided by the on-device shared provisioning SIM/eSIM controller 404 in the 'Set IMSI' command (or when execution errors occur at the shared provisioning SIM/eSIM 402 after receipt of the 'Set IMSI' command), a non-success error status indication can be returned by the shared provisioning SIM/eSIM 402 to the on-device shared provisioning SIM/eSIM controller 404.

Figure 10:
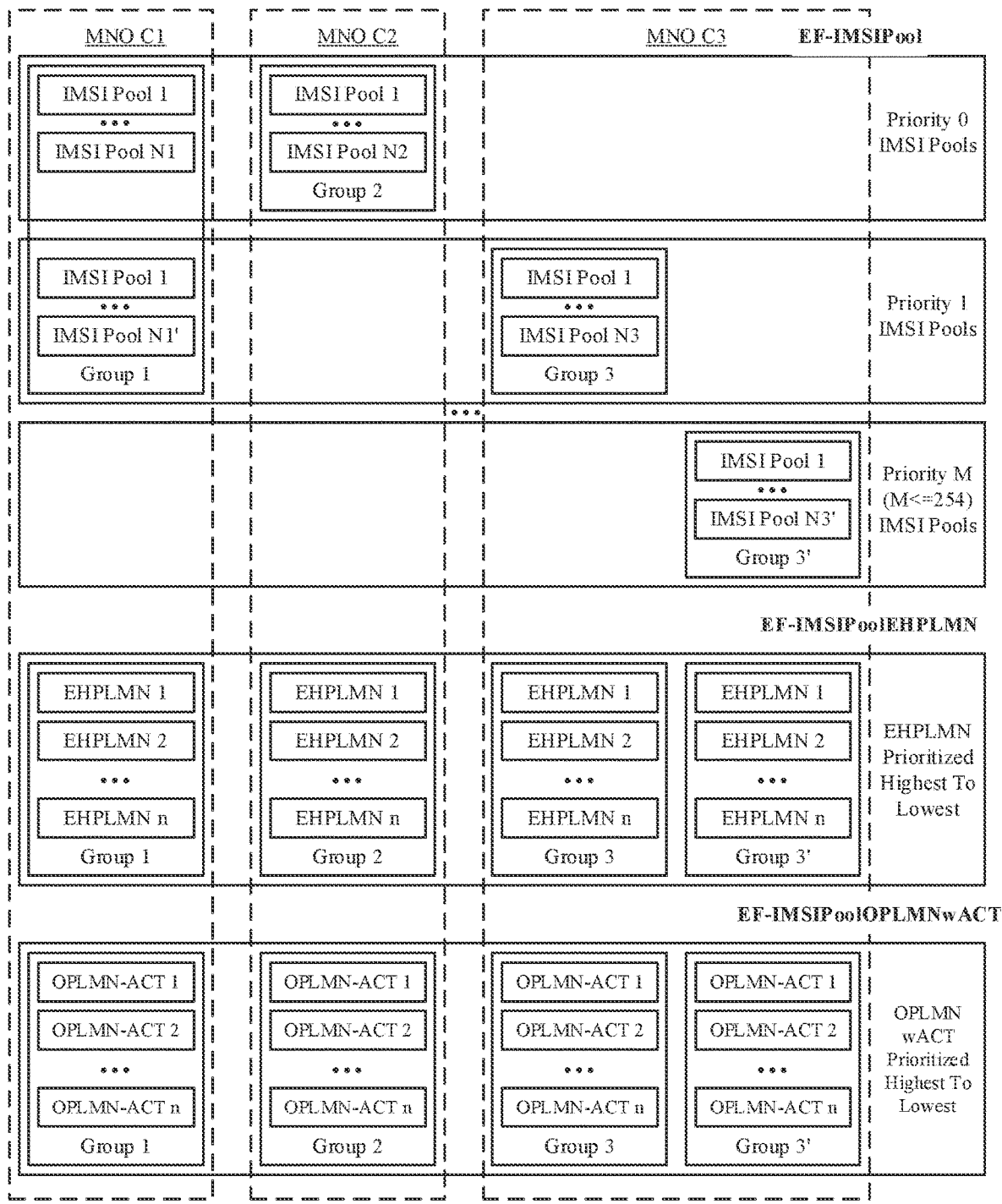
FIG. 10 illustrates a diagram of an example of associations between mobile network operators (MNOs), IMSI pool groups, EHPLMN lists, and OPLMN lists, according to some embodiments.

FIG. 10 illustrates a diagram 1000 that shows an example of relationships between contents of different elementary files (EFs) discussed hereinabove for particular example MNOs 114 (which can also referred to as carriers). The IMSI pool EF specifies IMSI pools organized into IMSI pool groups, each IMSI pool group designated with an IMSI pool group ID value and having priority levels assigned to each IMSI pool of the IMSI pool group as previously described for FIGS. 6A and 6B. Multiple IMSI pools for an MNO 114 can be organized together into a single IMSI pool group, where each IMSI pool group has the same group ID value and is associated with a common set of EHPLMNs and a common set of OPLMNs. IMSI pools of different priority levels can be included in the same IMSI pool group. The IMSI pools and IMSI pool groups can be flexibly designed to meet individual MNO 114 requirements, which can vary. An MNO can have i) a single IMSI pool group with IMSI pools at a single priority level (e.g., MNO C2), ii) a single IMSI pool group with IMSI pools at different priority levels (e.g., MNO C1), or iii) multiple IMSI pool groups at different priority levels (e.g., MNO C3). IMSI pools for different MNOs 114 can share the same priority level or can be situated at different priority levels. IMSI pools for a single MNO 114 can also be at a single priority level or at multiple priority levels.

MNO C1 illustrates an example of an MNO 114 having an IMSI pool group that has multiple IMSI pools at different priority levels. For MNO C1, as shown, an IMSI pool group 1 includes multiple IMSI pools (individually labeled as 1 through N1) at a highest ('0') priority level and also multiple IMSI pools (individually labeled as 1 though N1') at a next highest ('1') priority level. This highest and next highest priority levels are given as examples, and an IMSI pool group could have IMSI pools at any mixture of priority levels, e.g., at priority levels 5 and 8 (not shown). Each IMSI value includes an MCC value, an MNC value, and an MSIN value. As the MNC portion of the IMSI value is specific to a particular MNO 114, IMSI pools for different MNOs 114 are disjoint. IMSI pools are always unique and cannot have overlapping IMSI values within a particular MNO 114 or across different MNOs 114. The IMSI Pool Group 1 for MNO C1 is associated with a prioritized list of EHPLMNs (also labeled as Group 1) and a prioritized list of OPLMNs with associated ACT values (further labeled as Group 1). EHPLMN and OPLMNwACT values can be organized from a highest priority level to a lowest priority level within each of their respective lists.

MNO C2 illustrates an example of an MNO 114 having an IMSI pool group with IMSI pools all at a particular priority level, e.g., IMSI Pool Group 2 for MNO C2 includes a set of IMSI pools (labeled as 1 to N2) at the highest ('0') priority level. This highest priority level is given as an example, and a IMSI pool group could also have IMSI pools at another priority level, e.g., at priority level 4 (not shown). IMSI Pool Group 2 is associated with its own prioritized list of EHPLMNs and prioritized list of OPLMNs with ACT values.

MNO C3 illustrates an example of an MNO having multiple IMSI pool groups at different priority levels, e.g., IMSI Pool Group 3 for MNO C3 includes IMSI pools (labeled as 1 to N3) at a second highest ('1') priority level, and IMSI Pool Group 3' for MNO C3 includes IMSI pools (labeled as 1 to N3') at a lower ('M') priority level. Each IMSI pool group for MNO C3 has their own associated prioritized list of EHLPLMNs and prioritized list of OPLMNs with ACT values.

Figure 11A:
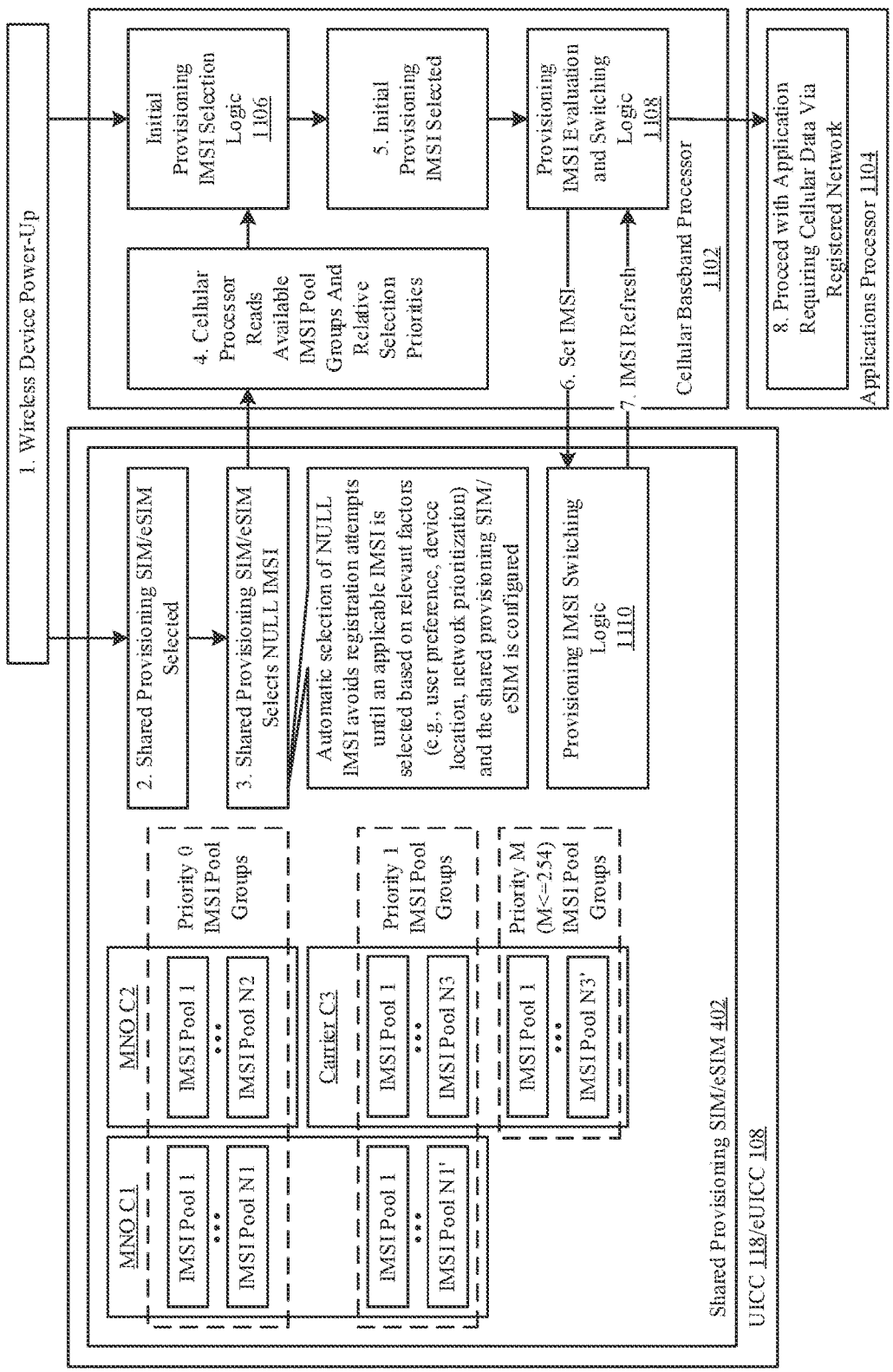
FIG. 11A illustrates a diagram of an example of automatic selection of IMSI values for a shared provisioning SIM/eSIM, according to some embodiments.

FIG. 11A illustrates a diagram 1100 of automatic IMSI selection and configuration for a shared provisioning SIM/eSIM 402 by a wireless device 102. Responsive to a power-up procedure by the wireless device 102, a cellular baseband processor 1102 of the wireless device 102 selects a shared provisioning SIM/eSIM 402, which can be configured to use for access to a cellular wireless network, e.g., as part of an initialization procedure to communicate with OEM managed servers when setting up the wireless device 102, or as part of a cellular configuration procedure to communicate with MNO provisioning servers 116 to obtain a fully functional cellular eSIM for the wireless device 102. The shared provisioning SIM/eSIM 402 can be used when alternative communication means, e.g., non-cellular wireless access or hard-wired access, are not available to the wireless device 102 to perform the initialization or configuration procedure. The shared provisioning SIM/eSIM 402 can select a null IMSI value, e.g., an IMSI value that cannot be used for establishing a connection with a cellular wireless network, after a power-up. Automatic selection of a null IMSI value can avoid having the wireless device 102 attempt to register with a cellular wireless network until an appropriate initial IMSI value is selected and used to configure the shared provisioning SIM/eSIM 402. Selection of the initial IMSI value can be based on relevant factors such as a user preference for an MNO 114, a geographic location in which the wireless device 102 is operating, prioritization among various PLMNs, etc. An on-device shared provisioning SIM/eSIM controller 404, resident on the cellular baseband processor 1102 of the wireless device 102, can obtain (e.g., by reading) from the shared provisioning SIM/eSIM 402 information that specifies available IMSI values, which can be organized into IMSI pools and IMSI pool groups, along with selection priorities for choosing among the IMSI values. The on-device shared provisioning SIM/eSIM controller 404 of the cellular baseband processor 1102 includes initial provisioning IMSI selection logic 1106 that processes the IMSI pool group information and selection priority information to determine an initial provisioning IMSI value for the shared provisioning SIM/eSIM 402. Provisioning IMSI evaluation and switching logic 1108 of the on-device shared provisioning SIM/eSIM controller 404 of the cellular baseband processor 1102 sends a 'Set IMSI' APDU command to IMSI switching logic 1110 of the UICC/eUICC 118 to configure the shared provisioning SIM/eSIM 402 with the selected initial provisioning IMSI value. The shared provisioning SIM/eSIM 402 returns to cellular baseband processor 1102, including to a cellular software stack 406 and to the on-device shared provisioning SIM/eSIM controller 404, a proactive IMSI refresh command to indicate the shared provisioning SIM/eSIM 402 has been configured with the selected provisioning IMSI value. A cellular software stack 406 of the cellular baseband processor 1102 can perform a network scanning procedure to determine available PLMNs and attempt to register with a located cellular wireless network using profile parameters of the shared provisioning SIM/eSIM 402 configured with the initial provisioning IMSI value. Upon successful registration with a cellular wireless network, the cellular baseband processor 1102 of the wireless device 102 can provide an indication to the applications processor 1104 of the successful cellular wireless connection to allow the applications processor 1104 to proceed with an application that requires access to cellular data via the registered cellular wireless network. Until a fully functional eSIM 208 is downloaded and installed on the eUICC 108 of the wireless device 102 (or a fully functional SIM stored on a UICC 118 is installed in the wireless device 102), the connection to the registered cellular wireless network using the profile parameters of the shared provisioning SIM/eSIM 402 can be restricted to particular use cases, e.g., for communication with particular endpoints such as an OEM server for configuration of the wireless device 102 or for communication with an MNO provisioning server 116 for obtaining a fully functional eSIM 208. When registration with a cellular wireless network is not successful using profile parameters of the shared provisioning SIM/eSIM 402 configured with the initial provisioning IMSI value, the cellular baseband processor 1102 can attempt to register with another cellular wireless network or can select another provisioning IMSI value with which to re-configure the shared provisioning SIM/eSIM 402 and then re-attempt registration with one or more cellular wireless networks. Reselection of provisioning IMSI values and cellular wireless network registration attempts can be repeated until successful registration occurs or a threshold number of retries has been reached. Selection of different provisioning IMSI values to use for re-configuring the shared provisioning SIM/eSIM 402 can be based on numerous criteria, e.g., device specific properties, user preferences, available cellular wireless networks, IMSI pool priorities, network (e.g., EHPLMN and OPLMN) prioritization, etc.

Figure 11B:
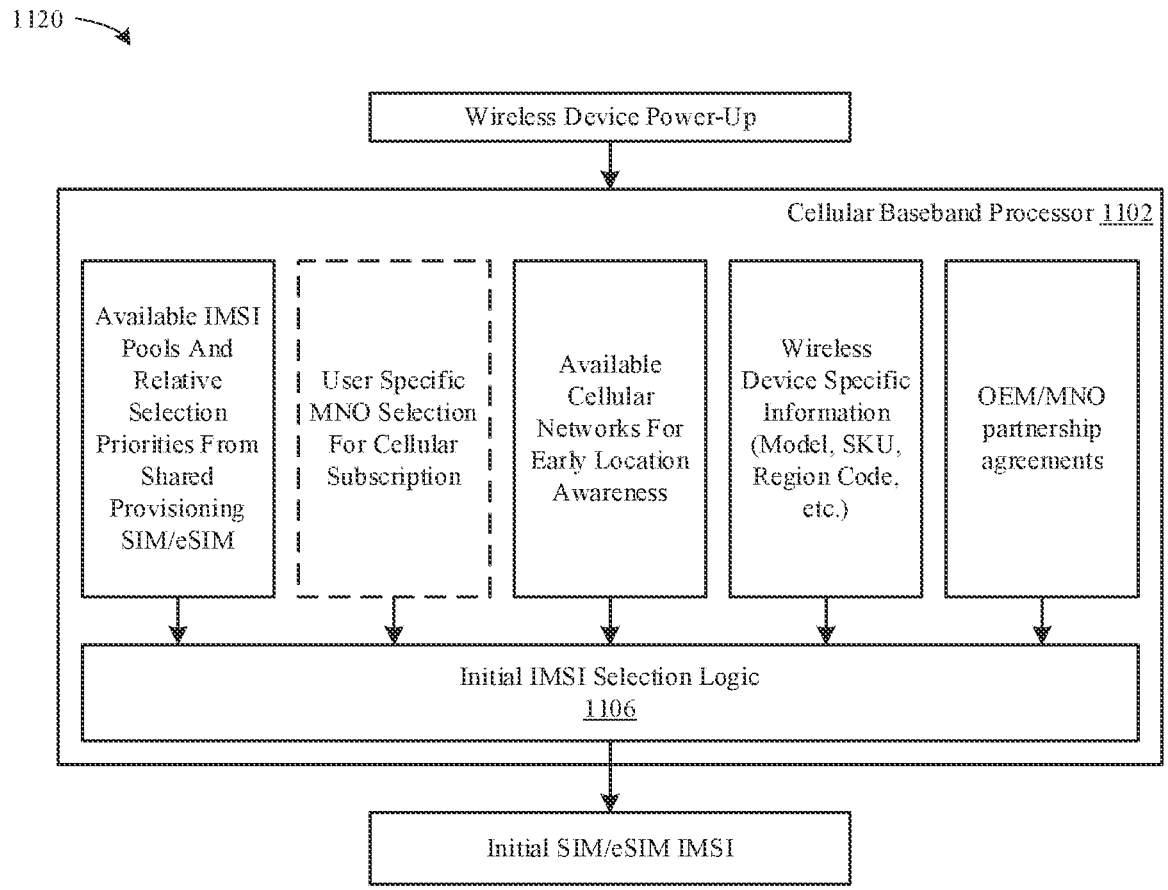
FIG. 11B illustrates a diagram of an example of initial IMSI selection for a shared provisioning SIM/eSIM, according to some embodiments.

FIG. 11B illustrates a diagram 1120 of exemplary selection criteria used to determine an initial IMSI value for a shared provisioning SIM/eSIM 402 by initial provisioning IMSI selection logic 1106 that can be included in an on-device shared provisioning SIM/eSIM of a cellular baseband processor 1102 of a wireless device 102. The on-device shared provisioning SIM/eSIM controller 404 of the cellular baseband processor 1102 can use one or more of the selection criteria to select an IMSI for the shared provisioning SIM/eSIM 402 after a power-up of the wireless device 102. The on-device shared provisioning SIM/eSIM controller 404 of the cellular baseband processor 1102 can obtain information regarding available IMSI pools (which can be organized into IMSI pool groups) and relative selection priorities for selecting the initial IMSI value. Priorities can include priority levels for IMSI pools as well as prioritization of PLMNs associated with particular MNOs 114. In some cases, the on-device shared provisioning SIM/eSIM controller 404 of the cellular baseband processor 1102 access information regarding a user selection or preference for one or more particular MNOs 114, which can influence selection of the initial IMSI value with which to configure the shared provisioning SIM/eSIM 402. In some embodiments, the cellular baseband processor 1102 performs a cellular wireless network scan procedure to determine available PLMNs visible to the wireless device 102 where the wireless device 102 is operating and uses the available PLMNs to inform the selection of the initial IMSI value for configuring the shared provisioning SIM/eSIM 402. In some cases, the cellular baseband processor 1102 of the wireless device 102 uses device-specific information, such as a hardware model number for the wireless device 102, a stock keeping unit (SKU) value for the wireless device 102, a region code associated with the wireless device 102, or other parameters configured for the wireless device 102 that can narrow or prioritize selection of an IMSI, IMSI pool, IMSI pool group, or PLMN for selecting an initial IMSI value for configuring the shared provisioning SIM/eSIM 402. In some embodiments, the cellular baseband processor 1102 uses information from one or more partnership agreements between an OEM of the wireless device 102 and one or more MNOs 114 to determine an initial IMSI value for configuring the shared provisioning SIM/eSIM 402. For example, the OEM of the wireless device 102 can maintain contracts with one or more MNOs 114 for limited functionality cellular wireless access to allow wireless devices 102 manufactured by the OEM to connect for select purposes, such as to configure the wireless device 102 by communication with OEM managed servers or to access MNO provisioning servers 116 to obtain a fully functional eSIM 208 or subscribe to a cellular wireless network service. In some cases, the OEM can seek to distribute wireless devices 102 across cellular wireless networks managed by different MNOs 114 based on contractual partnership agreements.

Figure 11C:
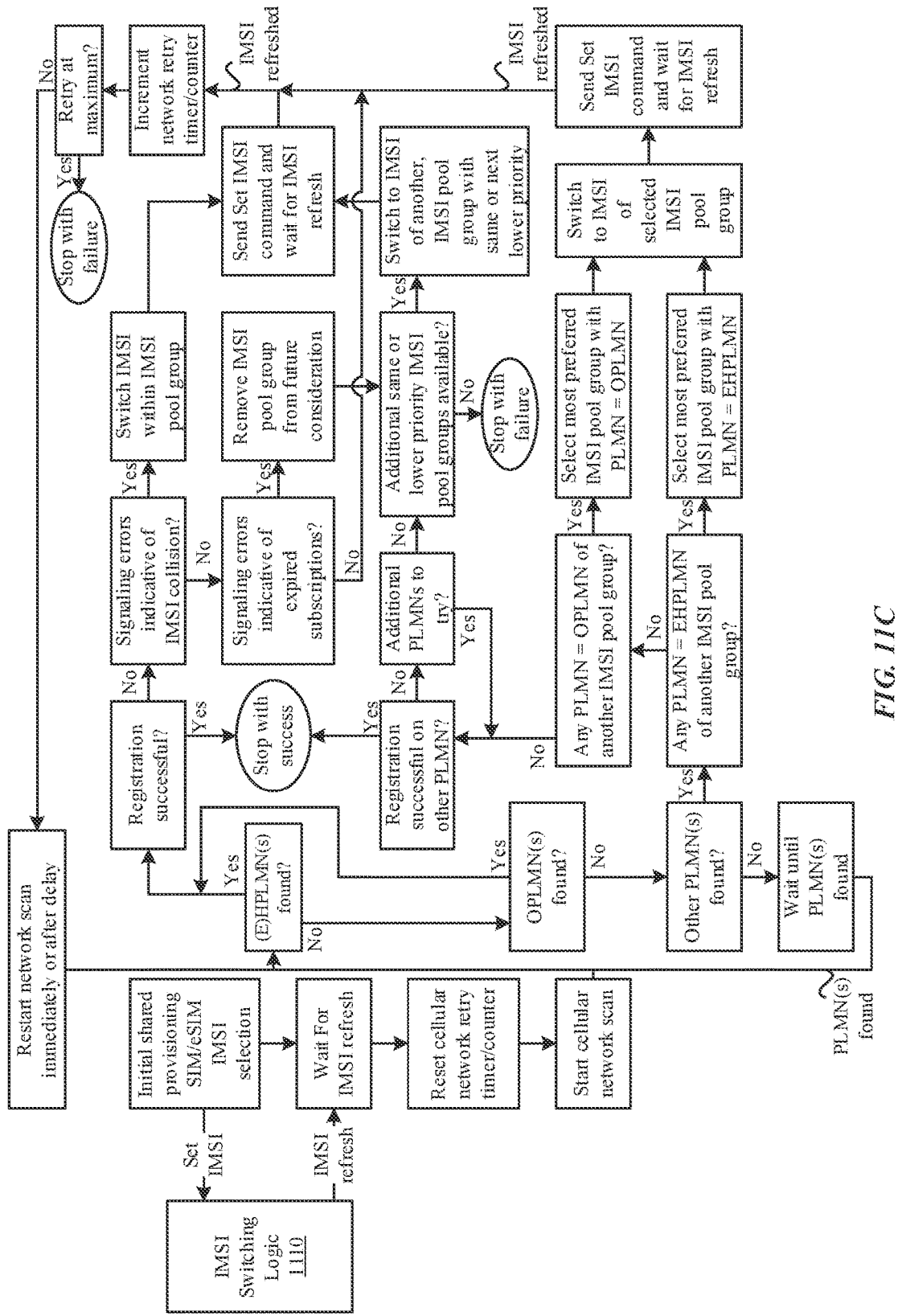
FIG. 11C illustrates a diagram of an example of IMSI evaluation and switching for a shared provisioning SIM/eSIM, according to some embodiments.

FIG. 11C illustrates a diagram 1130 of an exemplary set of actions performed by a wireless device 102 to select IMSI values, evaluate conditions when attempting to connect to cellular wireless networks using selected IMSI values, and switch between different selected IMSI values for configuring a shared provisioning SIM/eSIM 402 of the wireless device 102. An initial IMSI value is selected for the shared provisioning SIM/eSIM 402, as described for FIG. 11B, and a cellular baseband processor 1102 of the wireless device 102 sends a 'Set IMSI' APDU command to IMSI switching logic 1110 of the UICC/eUICC 118/108 to configure the shared provisioning SIM/eSIM 402 with the selected initial IMSI value. The IMSI switching logic 1110 of the UICC/eUICC 118/108 returns a proactive IMSI refresh command to the cellular baseband processor 1102 to indicate the updated configuration of the provisioning SIM/eSIM 402. The cellular baseband processor 1102 resets a cellular network retry mechanism, e.g., a timer or counter, and initiates a cellular wireless network scanning procedure to ascertain available PLMNs with which the wireless device 102 can attempt to establish a cellular wireless connection using profile parameters of the configured shared provisioning SIM/eSIM 402. Provisioning IMSI evaluation and switching logic 1108 of the cellular baseband processor 1102 can prioritize selection of PLMNs witch which to attempt registration and when selecting a new IMSI, IMSI pool, or IMSI pool group. When a home PLMN (HPLMN) or equivalent HPLMN (EHPLMN)—or an operator preferred PLMN (OPLMN)—is located, the cellular baseband processor 1102 can attempt to register on the located HPLMN, EHPLMN, or OPLMN using profile parameters of the shared provisioning SIM/eSIM 402 with a most recently configured IMSI value. When registration on the HPLMN, EHPLMN, or OPLMN succeeds, the cellular baseband processor 1102 can halt further PLMN searching and IMSI switching and provide an indication to an applications processor 1104 of the successful registration. When registration is not successful on one or more detected HPLMN, EHPLMNs, or OPLMNs, the cellular baseband processor 1102 can evaluate signaling error messages received via the cellular software stack 406 to determine whether an IMSI collision is likely to have occurred, e.g., the IMSI value with which the shared provisioning SIM/eSIM 402 is currently configured may be also used by another wireless device 102 to attempt to connect or to maintain an active connection with the PLMN to which the wireless device 102 attempted to register. An IMSI collision can occur on any PLMN, including while roaming, on an HPLMN, on an EHPLMN, on an OPLMN, etc. If multiple wireless devices 102 use the same IMSI value to attach to an identical PLMN in a concurrent manner, then an IMSI collision can occur. When the cellular baseband processor 1102 determines that the signaling error messages are indicative of an IMSI collision, the provisioning IMSI evaluation and switching logic 1108 can select another IMSI value in the IMSI pool group that includes the currently used IMSI value. The provisioning IMSI evaluation and switching logic 1108 can send a new 'Set IMSI' APDU command to the IMSI switching logic 1110 to re-configure the shared provisioning SIM/eSIM 402 with the newly selected IMSI value. After receiving an IMSI refresh command indicating the shared provisioning SIM/eSIM 402 has been re-configured with the new IMSI value, the cellular baseband processor 1102 can increment the cellular network retry timer or counter mechanism and re-start a cellular wireless scanning procedure, immediately or after a pre-configured or configurable time delay, when the maximum number of retries has not yet been reached.

When the cellular baseband processor 1102 determines that the signaling error messages are not indicative of an IMSI collision but are indicative of an expired cellular wireless subscription for an MNO 114 associated with the IMSI pool group from which the currently used IMSI value was selected, the provisioning IMSI evaluation and switching logic 1108 can remove the currently used IMSI pool group from future consideration and determine whether there are additional IMSI pool groups available at the same or a lower priority level of the current IMSI pool group. When an equal or lower priority level IMSI pool group is available, the provisioning IMSI evaluation and switching logic 1108 can switch to the determined available IMSI pool group of the equal or lower priority level and select an IMSI value from the new IMSI pool group. The provisioning IMSI evaluation and switching logic 1108 can send a new 'Set IMSI' APDU command to the IMSI switching logic 1110 to re-configure the shared provisioning SIM/eSIM 402 with the newly selected IMSI value. After receiving an IMSI refresh command indicating the shared provisioning SIM/eSIM 402 has been re-configured with the new IMSI value, the cellular baseband processor 1102 can increment the cellular network retry timer or counter mechanism and re-start a cellular wireless scanning procedure, immediately or after a pre-configured or configurable time delay, when the maximum number of retries has not yet been reached.

When no detected PLMN is an HPLMN, an EHPLMN, or an OPLMN, the cellular baseband processor 1102 can attempt to register on any of the other detected PLMNs. When all detected PLMNs have been tried unsuccessfully, the provisioning IMSI evaluation and switching logic 1108 can determine whether there are additional IMSI pool groups available at the same or a lower priority level of the current IMSI pool group. When an equal or lower priority level IMSI pool group is available, the provisioning IMSI evaluation and switching logic 1108 can switch to the determined available IMSI pool group of the equal or lower priority level and select an IMSI value from the new IMSI pool group. The provisioning IMSI evaluation and switching logic 1108 can send a new 'Set IMSI' APDU command to the IMSI switching logic 1110 to re-configure the shared provisioning SIM/eSIM 402 with the newly selected IMSI value. After receiving an IMSI refresh command indicating the shared provisioning SIM/eSIM 402 has been re-configured with the new IMSI value, the cellular baseband processor 1102 can increment the cellular network retry timer or counter mechanism and re-start a cellular wireless scanning procedure, immediately or after a pre-configured or configurable time delay, when the maximum number of retries has not yet been reached.

When the provisioning IMSI evaluation and switching logic 1108 determines that all available IMSI pool groups have been tried without successful registration to an associated PLMN or a maximum number of retries have been attempted (e.g., the cellular network retry mechanism timer or counter reaches a threshold value), the cellular baseband processor 1102 can halt the IMSI evaluation and switching procedure and optionally provide a failure indication.

The cellular baseband processor 1102 can continue with evaluating PLMNs detected by the cellular network scanning procedure and attempt (or re-attempt) to connect to a located PLMN. When no HPLMNs, EHPLMNs, or OPLMNs are detected for the IMSI pool group from which the currently used IMSI value was selected, the cellular baseband processor 1102 can determine whether a PLMN was detected that is an HPLMN, an EHPLMN, or an OPLMN for a different IMSI pool group. When an HPLMN, an EHPLMN, or an OPLMN for a different IMSI pool group is detected, the provisioning IMSI evaluation and switching logic 1108 can select a most preferred IMSI pool group that includes the detected PLMN as an HPLMN, an EHPLMN, or an OPLMN, and select an IMSI value from the selected IMSI pool group. The provisioning IMSI evaluation and switching logic 1108 can send a new 'Set IMSI' APDU command to the IMSI switching logic 1110 to re-configure the shared provisioning SIM/eSIM 402 with the newly selected IMSI value. After receiving an IMSI refresh command indicating the shared provisioning SIM/eSIM 402 has been re-configured with the new IMSI value, the cellular baseband processor 1102 can increment the cellular network retry timer or counter mechanism and re-start a cellular wireless scanning procedure, immediately or after a pre-configured or configurable time delay, when the maximum number of retries has not yet been reached.

When no detected PLMNs are an HPLMN, an EHPLMN, or an OPLMN for any IMSI pool groups, but at least one detected PLMN is an OPLMN for another IMSI pool group, the provisioning IMSI evaluation and switching logic 1108 can select a most preferred IMSI pool group that includes the detected PLMN as an OPLMN and selected an IMSI value from the selected IMSI pool group. The provisioning IMSI evaluation and switching logic 1108 can send a new 'Set IMSI' APDU command to the IMSI switching logic 1110 to re-configure the shared provisioning SIM/eSIM 402 with the newly selected IMSI value. After receiving an IMSI refresh command indicating the shared provisioning SIM/eSIM 402 has been re-configured with the new IMSI value, the cellular baseband processor 1102 can increment the cellular network retry timer or counter mechanism and re-start a cellular wireless scanning procedure, immediately or after a pre-configured or configurable time delay, when the maximum number of retries has not yet been reached.

Figure 12A:
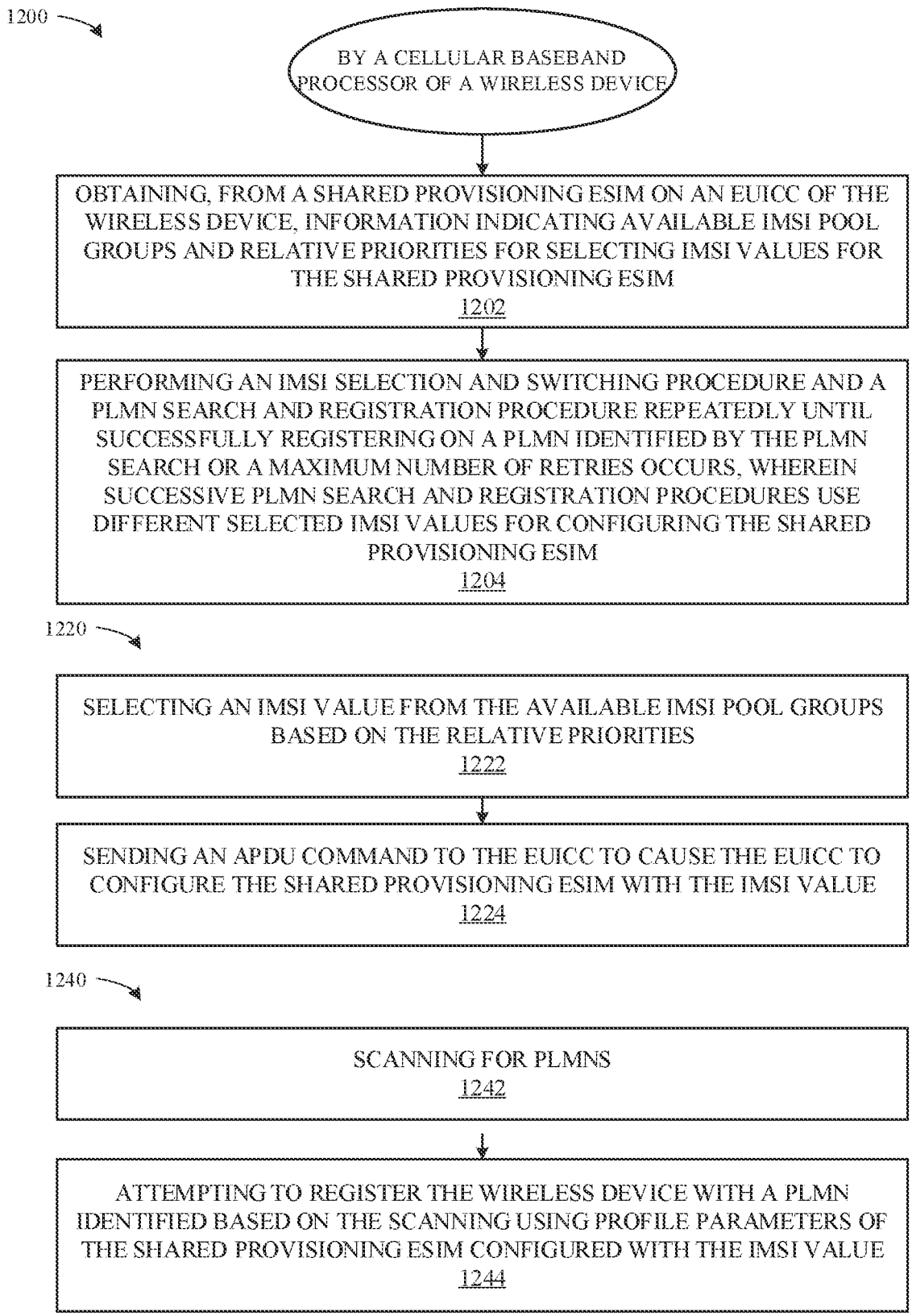
FIG. 12A illustrates flowcharts of an exemplary method to select IMSI values for a shared provisioning eSIM to connect to a PLMN, according to some embodiments.

FIG. 12A illustrates a flowchart 1200 of an exemplary method performed by a cellular baseband processor 1102 of a wireless device 102 to manage configuration of a shared provisioning eSIM 208 installed on an eUICC 108 of the wireless device 102. At 1202, the cellular baseband processor 1102 obtains, from the shared provisioning eSIM 208, information indicating available IMSI pool groups and relative priorities for selecting IMSI values for the shared provisioning eSIM 208. At 1204, the cellular baseband processor 1102 performs an IMSI selection and switching procedure and a PLMN search and registration procedure repeatedly until successfully registering on a PLMN identified by the PLMN search or a maximum number of retries occurs, where successive PLMN search and registration procedures use different selected IMSI values for configuring the shared provisioning eSIM 208.

The IMSI selection and switching procedure performed by the cellular baseband processor 1102, as summarized by the flowchart 1220, can include at 1222, selecting an IMSI value for the available IMSI pool groups based on the relative priorities; and at 12224, sending an APDU command to the eUICC 108 to cause the eUICC 108 to configure the shared provisioning eSIM 208 with the selected IMSI value.

The PLMN search registration procedure performed by the cellular baseband processor 1102, as summarized by the flowchart 1240, can include at 1242, scanning for PLMNs, and at 1244 attempting to register the wireless device 102 with a PLMN identified based on the scanning using profile parameters of the shared provisioning eSIM 208 configured with the selected IMSI value.

In some embodiments, the cellular baseband processor 1102 of the wireless device 102 prioritizes registration with an HPLMN or EHPLMN over other PLMNs identified based on the scanning. In some embodiments, the cellular baseband processor 1102 of the wireless device 102 prioritizes selecting an IMSI pool group, from which to select the IMSI value, based on identified PLMNs that are HPLMNs or EHPLMNs over OPLMNs or PLMNs that are not HPLMNs, EHPLMNs, or OPLMNs. In some embodiments, the cellular baseband processor 1102 of the wireless device 102 determines signaling errors received from a PLMN responsive to a registration attempt using a current IMSI value indicates an IMSI collision, where selection of a subsequent IMSI value includes switching to another IMSI value included in an IMSI pool group that includes the current IMSI value. In some embodiments, the cellular baseband processor 1102 of the wireless device 102 determines signaling errors received from a PLMN responsive to a registration attempt using a current IMSI value indicates an expired subscription and removes an IMSI pool group that includes the current IMSI value from future consideration by the PLMN search and registration procedure. In some embodiments, the cellular baseband processor 1102 of the wireless device 102: i) determines no PLMNs identified based on the scanning are HPLMNs or EHPLMNs for an IMSI pool group that includes the IMSI value, ii) determines a PLMN identified based on the scanning is an HPLMN or EHPLMN for another IMSI pool group, and iii) selects a most preferred IMSI pool group for which the PLMN is the HPLMN or EHPLMN, where selecting of a subsequent IMSI value includes switching to another IMSI value included in the most preferred IMSI pool group. A most preferred IMSI pool group can be one of the highest priority IMSI pool groups, for which a currently detected PLMN is configured as an HPLMN, an EHPLMN, or an OPLMN. In some embodiments, the cellular baseband processor 1102 of the wireless device 102: i) determines no PLMNs identified based on the scanning are HPLMNs or EHPLMNs for any available IMSI pool group, ii) determines a PLMN identified based on the scanning is an OPLMN for another IMSI pool group, and iii) selects a most preferred IMSI pool group for which the PLMN is the OPLMN, where selection of a subsequent IMSI value includes switching to another IMSI value included in the most preferred IMSI pool group. In some embodiments, the cellular baseband processor 1102 of the wireless device 102: i) initializes (or causes the eUICC 108 to initialize) the shared provisioning eSIM 208 with a null IMSI value after a power-up procedure, and ii) blocks registration attempts with PLMNs using the shared provisioning eSIM 208 until configuring the shared provisioning eSIM 208 with an initial non-null IMSI value. In some embodiments, the cellular baseband processor 1102 of the wireless device 102, after a power-up procedure: i) selects an initial non-null IMSI value for the shared provisioning eSIM 208 prior to performing a first IMSI selection and switching procedure, and ii) configures the shared provisioning eSIM 208 with the initial non-null IMSI value as part of the first IMSI selection and switching procedure. In some embodiments, selection of the initial non-null IMSI value is based on the available IMSI pool groups and relative priorities for selecting IMSI values for the shared provisioning eSIM 208. In some embodiments, selection of the initial non-null IMSI value is based on a user-specific selection for a cellular subscription of an MNO 114. In some embodiments, selection of the initial non-null IMSI value is based on a geographic region in which the wireless device 102 is operating. In some embodiments, selection of the initial non-null IMSI value is based on information specific to a hardware or software configuration of the wireless device 102. In some embodiments, selection of the initial non-null IMSI value is based on a partnership agreement between an OEM of the wireless device 102 and a MNO 114. In some embodiments: i) the IMSI pool groups include one or more non-overlapping IMSI pool groups for each MNO of a plurality of MNOs, ii) each IMSI pool group includes a plurality of IMSI pools and an associated group identifier value, and iii) each IMSI pool includes a plurality of IMSI values and an associated priority level. In some embodiments, IMSI pools having identical associated group identifier values are associated with a common respective prioritized list of EHPLMNs. In some embodiments, IMSI pools having identical associated group identifier values are associated with a common respective prioritized list of OPLMNs.

Figure 12B:
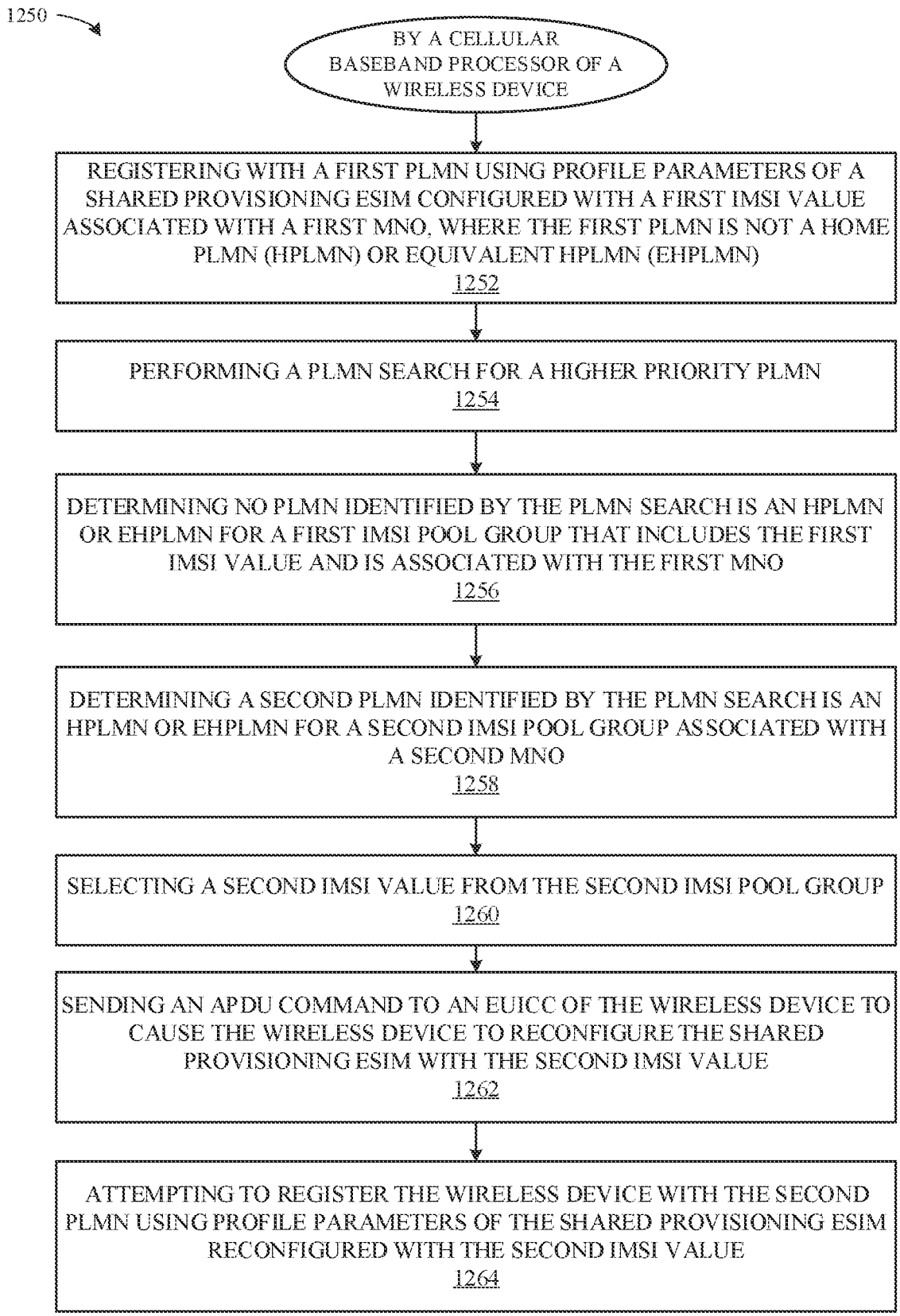
FIG. 12B illustrates a flowchart of an exemplary method to reconfigure a shared provisioning eSIM to connect to a different PLMN, according to some embodiments.

FIG. 12B illustrates a flowchart of an example of a cellular baseband processor 1102 of a wireless device 102 reconfiguring a shared provisioning eSIM 208 to attempt to switch from being connected to a first PLMN of a first MNO 114 to a second PLMN of a second MNO 114, where the first PLMN is not an HPLMN or EHPLMN and the second PLMN is an HPLMN or EHPLMN. At 1252, the cellular baseband processor 1102 of the wireless device 102 registers with a first PLMN using profile parameters of a shared provisioning eSIM 208 configured with a first IMSI value associated with a first MNO 114, where the first PLMN is not an HPLMN or an EHPLMN. At 1254, the cellular baseband processor 1102 of the wireless device 102 performs a PLMN search for a higher priority PLMN. At 1256, the cellular baseband processor 1102 of the wireless device 102 determines no PLMN identified by the PLMN search is an HPLMN or EHPLMN for a first IMSI pool group that includes the first IMSI value and is associated with the first MNO 114. At 1258, the cellular baseband processor 1102 of the wireless device 102 determines a second PLMN identified by the PLMN search is an HPLMN or EHPLMN for a second IMSI pool group associated with a second MNO 114. At 1260, the cellular baseband processor 1102 of the wireless device 102 selects a second IMSI value from the second IMSI pool group. At 1262, the cellular baseband processor 1102 of the wireless device 102 sends an APDU command to an eUICC 108 of the wireless device 102 to cause the eUICC 108 to reconfigure the shared provisioning eSIM 208 with the second IMSI value and associated profile parameters for the second IMSI value. At 1264, the cellular baseband processor 1102 of the wireless device 102 attempts to register the wireless device 102 with the second PLMN using profile parameters of the shared provisioning eSIM 208 reconfigured with the second IMSI value.

In some embodiments, the APDU command is a 'Set IMSI' APDU command used to switch IMSI values for the shared provisioning eSIM 208. The 'Set IMSI' APDU command can be used to switch the shared provisioning eSIM 208 from using a first IMSI value, with associated first profile parameters, to a second IMSI value, with associated second profile parameters, i.e., to switch the shared provisioning eSIM 208 from being configured with a first IMSI profile to a second IMSI profile. In FIG. 12B, the cellular baseband processor 1102 of the wireless device 102 initially connects, using a first IMSI profile, to a first PLMN that is neither an HPLMN nor an EHPLMN for a first MNO 114, and after performing a higher priority PLMN search identifies a second PLMN that is an HPLMN or EHPLMN but for a second MNO 114. Therefore, the cellular baseband processor 1102 sends the 'Set IMSI' APDU command to reconfigure the shared provisioning eSIM 208 from using the first IMSI value with the first IMSI profile parameters and associated with the first MNO 114 to the second IMSI value with the second IMSI profile parameters and associated with the second MNO 114. Based on the higher priority PLMN search, the wireless device 102 recognized that there were no PLMNs identified that were HPLMN or EHPLMN for the first MNO 114 but at least one PLMN identifier that was an HPLMN or EHPLMN for the second MNO 114, and therefore reconfiguration was required in order to connect to an HPLMN or EHPLMN. When multiple PLMNs are identified by the higher priority search to be an HPLMN or EHPLMN, and the PLMNs are from different IMSI pool groups, provisioning IMSI evaluation and switching logic 1108 of the cellular baseband processor 1102 can select an IMSI pool group having a highest priority level, among the different IMSI pool groups, select a new IMSI value from the selected IMSI pool group, reconfigure the shared provisioning eSIM 208 with the new IMSI value (and associated profile parameters), and attempt to register with the PLMN using profile parameters of the shared provisioning eSIM 208 reconfigured with the new IMSI value.

Representative Device

Figure 13:
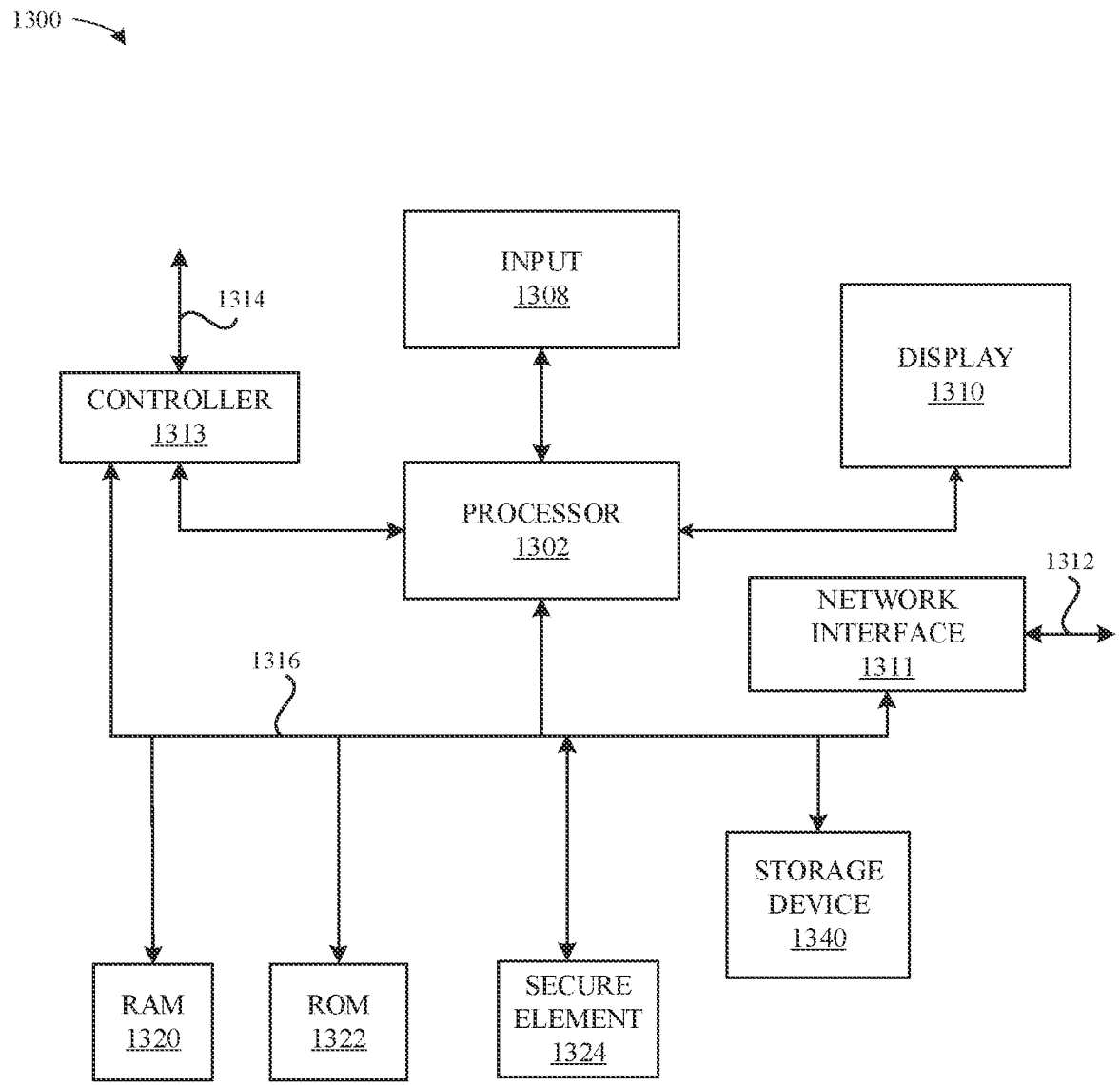
FIG. 13 illustrates a block diagram of exemplary elements of a wireless device, according to some embodiments.

FIG. 13 illustrates a detailed view of a representative computing device 1300 that can be used to implement various methods described herein, according to some embodiments. In particular, the detailed view illustrates various components that can be included in the wireless device 102. As shown in FIG. 13, the computing device 1300 can include a processor 1302 that represents a microprocessor or controller for controlling the overall operation of computing device 1300. The computing device 1300 can also include a user input device 1308 that allows a user of the computing device 1300 to interact with the computing device 1300. For example, the user input device 1308 can take a variety of forms, such as a button, keypad, dial, touch screen, audio input interface, visual/image capture input interface, input in the form of sensor data, etc. Still further, the computing device 1300 can include a display 1310 that can be controlled by the processor 1302 to display information to the user. A data bus 1316 can facilitate data transfer between at least a storage device 1340, the processor 1302, and a controller 1313. The controller 1313 can be used to interface with and control different equipment through an equipment control bus 1314. The computing device 1300 can also include a network/bus interface 1311 that communicatively couples to a data link 1312. In the case of a wireless connection, the network/bus interface 1311 can include a wireless transceiver.

The computing device 1300 also includes a storage device 1340, which can comprise a single disk or a plurality of disks (e.g., hard drives), and includes a storage management module that manages one or more partitions within the storage device 1340. In some embodiments, storage device 1340 can include flash memory, semiconductor (solid state) memory or the like. The computing device 1300 can also include a Random Access Memory (RAM) 1320 and a Read-Only Memory (ROM) 1322. The ROM 1322 can store programs, utilities or processes to be executed in a non-volatile manner. The RAM 1320 can provide volatile data storage, and stores instructions related to the operation of the computing device 1300. The computing device 1300 can further include a secure element (SE) 1324, which can represent secure storage for cellular wireless system access by the wireless device 102, such as an eUICC 108 on which to store one or more eSIMs 208 and/or a UICC 118 on which to store a SIM profile.

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High-Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for dynamic management of a shared provisioning electronic subscriber identity module (eSIM) installed on an embedded universal integrated circuit card (eUICC) of a wireless device, the method comprising:
by a cellular baseband processor of the wireless device:
obtaining, from the shared provisioning eSIM on the eUICC, information indicating available international mobile subscriber identity (IMSI) pool groups and relative priorities for selecting IMSI values for the shared provisioning eSIM; and
performing an IMSI selection and switching procedure and a public land mobile network (PLMN) search and registration procedure repeatedly until successfully registering on a PLMN identified by the PLMN search or a maximum number of retries occurs,
wherein:
the IMSI selection and switching procedure includes:
selecting an IMSI value from the available IMSI pool groups based on the relative priorities; and
sending an application protocol data unit (APDU) command to the eUICC to cause the eUICC to configure the shared provisioning eSIM with the IMSI value;
the PLMN search and registration procedure includes:
scanning for public land mobile networks (PLMNs); and
attempting to register the wireless device with a PLMN, identified based on the scanning for PLMNs, using profile parameters of the shared provisioning eSIM configured with the IMSI value; and
successive PLMN search and registration procedures use different selected IMSI values for configuring the shared provisioning eSIM.

2. The method of claim 1, further comprising:
by the cellular baseband processor of the wireless device:
prioritizing selecting an IMSI pool group, from which to select the IMSI value, based on identified PLMNs that are home PLMNs (HPLMNs) or equivalent HPLMNs (EHPLMNs) over operator preferred PLMNs (OPLMNs) or PLMNs that are not HPLMNs, EPHLMNs, or OPLMNs.

3. The method of claim 1, further comprising:
by the cellular baseband processor of the wireless device:
determining signaling errors received from a PLMN responsive to a registration attempt using a current IMSI value indicates an IMSI collision,
wherein selecting the IMSI value comprises switching to another IMSI value included in an IMSI pool group that includes the current IMSI value.

4. The method of claim 1, further comprising:
by the cellular baseband processor of the wireless device:
determining signaling errors received from a PLMN responsive to a registration attempt using a current IMSI value indicates an expired subscription; and
removing an IMSI pool group that includes the current IMSI value from future consideration by the PLMN search and registration procedure.

5. The method of claim 1, further comprising:
by the cellular baseband processor of the wireless device:
determining no PLMNs identified based on the scanning are home PLMNs (HPLMNs) or equivalent HPLMNs (EHPLMNs) for an IMSI pool group that includes the IMSI value;
determining a PLMN identified based on the scanning is a home PLMN (HPLMN) or equivalent HPLMN (EHPLMN) for another IMSI pool group; and
selecting a most preferred IMSI pool group for which the PLMN is the HPLMN or EPHLMN,
wherein selecting the IMSI value comprises switching to another IMSI value included in the most preferred IMSI pool group.

6. The method of claim 1, further comprising:
by the cellular baseband processor of the wireless device:
determining no PLMNs identified based on the scanning for PLMNs are home PLMNs (HPLMNs) or equivalent HPLMNs (EHPLMNs) for any available IMSI pool group;
determining a PLMN identified based on the scanning for PLMNs is an operator preferred PLMN (OPLMN) for another IMSI pool group; and
selecting a most preferred IMSI pool group for which the PLMN is the OPLMN,
wherein selecting the IMSI value comprises switching to another IMSI value included in the most preferred IMSI pool group.

7. The method of claim 1, further comprising:
by the cellular baseband processor of the wireless device:
initializing the shared provisioning eSIM with a null IMSI value after a power-up procedure; and
blocking registration attempts with PLMNs using the shared provisioning eSIM until configuring the shared provisioning eSIM with an initial non-null IMSI value.

8. The method of claim 1, further comprising:
by the cellular baseband processor of the wireless device, after a power-up procedure:
selecting an initial non-null IMSI value for the shared provisioning eSIM prior to performing a first IMSI selection and switching procedure; and
configuring the shared provisioning eSIM with the initial non-null IMSI value as part of the first IMSI selection and switching procedure.

9. The method of claim 8, wherein selection of the initial non-null IMSI value is based on the available IMSI pool groups and relative priorities for selecting IMSI values for the shared provisioning eSIM.

10. The method of claim 8, wherein selection of the initial non-null IMSI value is based on a user-specific selection for a cellular subscription of a mobile network operator (MNO).

11. The method of claim 8, wherein selection of the initial non-null IMSI value is based on a geographic region in which the wireless device is operating.

12. The method of claim 8, wherein selection of the initial non-null IMSI value is based on information specific to a hardware or software configuration of the wireless device.

13. The method of claim 8, wherein selection of the initial non-null IMSI value is based on a partnership agreement between an original equipment manufacturer (OEM) of the wireless device and a mobile network operator (MNO).

14. The method of claim 1, wherein:
the IMSI pool groups include one or more non-overlapping IMSI pool groups for each mobile network operator (MNO) of a plurality of MNOs,
each IMSI pool group includes a plurality of IMSI pools and an associated group identifier value, and
each IMSI pool includes a plurality of IMSI values and an associated priority level.

15. The method of claim 14, wherein IMSI pools having identical associated group identifier values are associated with a common respective prioritized list of equivalent home PLMNs (EHPLMNs).

16. The method of claim 14, wherein IMSI pools having identical associated group identifier values are associated with a common respective prioritized list of operator preferred PLMNs (OPLMNs).

17. A wireless device comprising:
wireless circuitry comprising one or more antennas; and
one or more processors communicatively coupled to the wireless circuitry and to a memory storing instructions that, when executed by the one or more processors, configure the wireless device to:
read, from a shared provisioning electronic subscriber identity module (eSIM) on an embedded universal integrated circuit card (eUICC) of the wireless device, available international mobile subscriber identity (IMSI) pool groups and relative priorities for selecting IMSI values for the shared provisioning eSIM; and
perform an IMSI selection and switching procedure and a public land mobile network (PLMN) search and registration procedure repeatedly until successfully registering on a PLMN identified by the PLMN search or a maximum number of retries occurs,
wherein:
the IMSI selection and switching procedure includes:
selecting an IMSI value from the available IMSI pool groups based on the relative priorities; and
sending an application protocol data unit (APDU) command to the eUICC to cause the eUICC to configure the shared provisioning eSIM with the IMSI value;
the PLMN search and registration procedure includes:
scanning for public land mobile networks (PLMNs); and
attempting to register the wireless device with a PLMN, identified based on the scanning for PLMNs, using profile parameters of the shared provisioning eSIM configured with the IMSI value and
successive PLMN search and registration procedures use different selected IMSI values.

18. The wireless device of claim 17, wherein the wireless device is further configured to:
determine signaling errors received from a PLMN responsive to a registration attempt using a current IMSI value indicates an IMSI collision,
wherein selecting the IMSI value comprises switching to another IMSI value included in an IMSI pool group that includes the current IMSI value.

19. The wireless device of claim 17, wherein the wireless device is further configured to:
determine signaling errors received from a PLMN responsive to a registration attempt using a current IMSI value indicates an expired subscription; and
remove an IMSI pool group that includes the current IMSI value from future consideration by the PLMN search and registration procedure.

20. An apparatus configured for operation in a wireless device, the apparatus comprising one or more processors communicatively coupled to a memory storing instructions that, when executed by the one or more processors, configure the wireless device to:
register with a first public land mobile network (PLMN) using profile parameters of a shared provisioning electronic subscriber identity module (eSIM) configured with a first international mobile subscriber identity (IMSI) value associated with a first mobile network operator (MNO), where the first PLMN is not a home PLMN (HPLMN) or equivalent HPLMN (EHPLMN);
perform a PLMN search for a higher priority PLMN;
determine no PLMN identified by the PLMN search is an HPLMN or EHPLMN for a first IMSI pool group that includes the first IMSI value and is associated with the first MNO;
determine a second PLMN identified by the PLMN search is an HPLMN or EHPLMN for a second IMSI pool group associated with a second MNO;

select a second IMSI value from the second IMSI pool group; and send an application protocol data unit (APDU) command to an embedded universal integrated circuit card (eUICC) of the wireless device to cause the eUICC to reconfigure the shared provisioning eSIM with the second IMSI value; and attempt to register the wireless device with the second PLMN using profile parameters of the shared provisioning eSIM reconfigured with the second IMSI value.

* * * * *